(12) United States Patent
Mitani

(10) Patent No.: US 6,407,877 B1
(45) Date of Patent: Jun. 18, 2002

(54) RECORDING/REPRODUCING METHOD AND APPARATUS IN WHICH HEAD DRIVER IS UNLOCKED WHEN MEDIUM IS LOADED AND WHEN TRACK POSITION INFORMATION FORMULATION BASED ON OPTICAL SIGNAL INPUT HAS BEEN COMPLETED

(75) Inventor: Akira Mitani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/267,312

(22) Filed: Mar. 12, 1999

(30) Foreign Application Priority Data

Mar. 18, 1998 (JP) ............................................ 10-068802

(51) Int. Cl.[7] .............................................. G11B 5/596
(52) U.S. Cl. ................................. 360/78.11; 360/73.03; 360/77.02
(58) Field of Search .......................... 360/78.01, 78.04, 360/78.11, 78.12, 78.13, 78.14, 77.02, 77.03, 73.03

(56) References Cited

U.S. PATENT DOCUMENTS 5,130,962 A * 7/1992 Ogawa ................. 369/44.28 X
5,303,107 A * 4/1994 Miura et al. ................. 360/137
5,612,835 A * 3/1997 Shirota et al. ............ 360/78.14

* cited by examiner

*Primary Examiner*—Andrew L. Sniezek
(74) *Attorney, Agent, or Firm*—Oblon, Spivak, McClelland, Maier & Neustadt, P.C.

(57) ABSTRACT

In a recording/reproducing apparatus, a controller includes a counter responsive to incoming track feed requesting pulses to count the number of the pulses, a head movable state detection unit for detecting a movable state of a magnetic head, and a track feed controller responsive to the count value of the track feed requesting pulse counter to effect track feed of the magnetic head. Detection of the movable state depends on the recording medium being loaded and on completion of the formulation of track position information that is derived from an optical signal that varies as a function of track position. The track feed controller effects track feed of the magnetic head, responsive to the count value of the track feed requesting pulse counter, following detection of the movable state of the magnetic head.

7 Claims, 17 Drawing Sheets

| CURRENT POSITION | 0 | 1 | 2 | 3 | 4 | 5 | --------- | 37 | 38 | 39 |
|---|---|---|---|---|---|---|---|---|---|---|
| EXPECTED SPEED | 4 | 4 | 3 | 3 | 2 | 2 | --------- | 1 | 0 | 0 |

| COUNT CHANGING STATE | SELECTED MODE | CONTROL CONTENTS OF THE MODE |
| --- | --- | --- |
| FROM 0 TO 1 | MODE 0 | 'SINGLE TRACK FEED' ACCOMPANIED BY MOVEMENT START CONTROL |
| FROM 2 TO 1 | MODE 1 | 'SINGLE TRACK FEED' NOT ACCOMPANIED BY MOVEMENT START CONTROL |
| OTHER CHANGE | MODE 2 | CONSTANT TRACK FEED (2.4 msec / TRACK) |

FIG.17

RECORDING/REPRODUCING METHOD AND APPARATUS IN WHICH HEAD DRIVER IS UNLOCKED WHEN MEDIUM IS LOADED AND WHEN TRACK POSITION INFORMATION FORMULATION BASED ON OPTICAL SIGNAL INPUT HAS BEEN COMPLETED

BACKGROUND OF THE INVENTION

1. Field of the Invention

This invention relates to a recording/reproducing apparatus and a recording/reproducing system for recording/reproducing information signals for a recording medium.

2. Description of the Related Art

Up to now, recording/reproduction of information signals for a flexible disc is executed bu a recording/reproducing apparatus having a magnetic head. In recording/reproducing information signals, the magnetic head is moved to a desired data track.

Specifically, there are formed plural data tracks on the recording medium. For this recording medium, the recording/reproducing apparatus moves the magnetic head to a desired data track to record/reproduce information signals. In certain types of the recording medium, the position information of each data track is stored. In such recording medium, the recording/reproducing apparatus shifts the magnetic head to the desired data track based on the position information.

Up to how, it is known to use a stepping motor as driving means for a magnetic head. In a majority of cases, the recording/reproducing apparatus is controlled by an external computer. In this type of the recording/reproducing apparatus, the magnetic head is moved by the stepping motor, responsive to a track feed request pulse supplied from the external computer, in an amount corresponding to the specified number of pulses.

Meanwhile, in a recording/reproducing apparatus, the magnetic head is occasionally locked against displacement. By locking the magnetic head against displacement, with the recording medium not being loaded in position, it is possible to prevent destruction of the magnetic head.

Up to now, such a recording medium having a recording capacity on formatting equal to approximately 1.44 Mbytes, for example, a flexible disc, referred to hereinafter as a lower-order recording medium, is used extensively. Recently, such a recording medium having the increased recording capacity at the time of formatting equal to 150 to 650 Mbytes, referred to hereinafter as an upper-order recording medium, as al result of reducing the track width, has been proposed. In this upper-order recording medium, the position information of the data track is stored in the data track. Meanwhile, the position information of the data track is not stored in the lower-order recording medium.

In consideration of co-existence of the lower-order recording medium and the upper-order recording medium, such a recording/reproducing apparatus is proposed which records/reproduces the information signals for both recording mediums. For example, in a certain recording/reproducing apparatus, a linear motor operating as a voice coil motor is used to shift the magnetic head along the radius of the recording medium.

In this type of the recording/reproducing apparatus, in which the driving means for the magnetic head is constituted by a voice coil motor, the magnetic head is locked against displacement, in the state in which the recording medium is loaded thereon, as described above, in order to prevent possible destruction of the magnetic head.

However, if, with the magnetic head locked against displacement, the track feed requesting pulse arrives from the external computer, the magnetic head is not moved, as a result of which the magnetic head position envisaged by the external computer differs from the actual magnetic head position. That is, in a recording/reproducing apparatus constructed so that it cannot instantly respond to the track feed requesting pulse due to, for example, the above-mentioned locking, the magnetic head occasionally cannot be fed to the desired track position.

SUMMARY OF THE INVENTION

It is therefore an object of the present invention to provide a recording/reproducing method and apparatus whereby the track feed can be positively performed responsive to the oncoming track feed requesting pulse.

BRIEF DESCRIPTION OF THE DRAWINGS

FIG. 4a is a plain side view thereof and FIG. 4b is a side view thereof showing first and second openings to an enlarged scale.

FIG. 17 shows the transition of the current count values and the track feed mode corresponding to the transition in the recording/reproducing apparatus.

DESCRIPTION OF THE PREFERRED EMBODIMENTS

Figure 1:
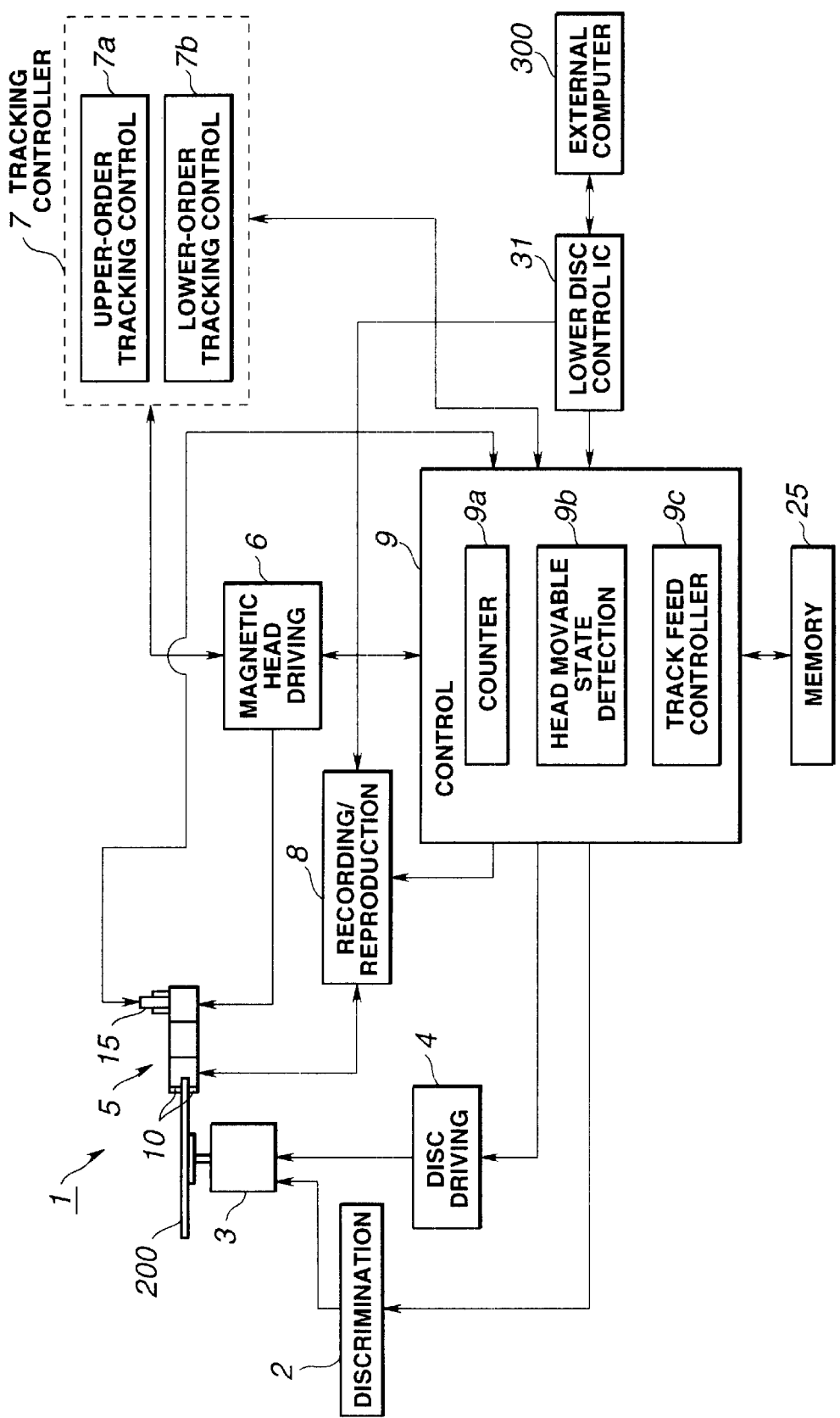
FIG. 1 is a block circuit diagram showing a recording/reproducing apparatus embodying the present invention.

Referring to the drawings, a recording/reproducing apparatus according to a preferred embodiment of the present invention will be explained in detail. The present embodiments is directed to a recording/reproducing apparatus for recording/reproducing both a flexible disc having a pre-set track pitch and a recording capacity at the time of formatting of approximately 1.44 Mbytes (lower-order disc) and another flexible disc having a track pitch narrower than that of the lower-order disc and a higher recording density than that of the lower-order disc, with the recording capacity at the time of formatting of 150 to 650 Mbytes (upper-order disc). The recording/reproducing apparatus is configured for recording/reproducing information signals by rotationally driving the lower-order disc or the upper-order disc at a rotational speed of the order of 300 to 600 rpm or approximately 1200 to 3600 rpm. In the following explanation, the lower-order disc and the upper-order disc are sometimes collectively termed a magnetic disc.

Figure 2:
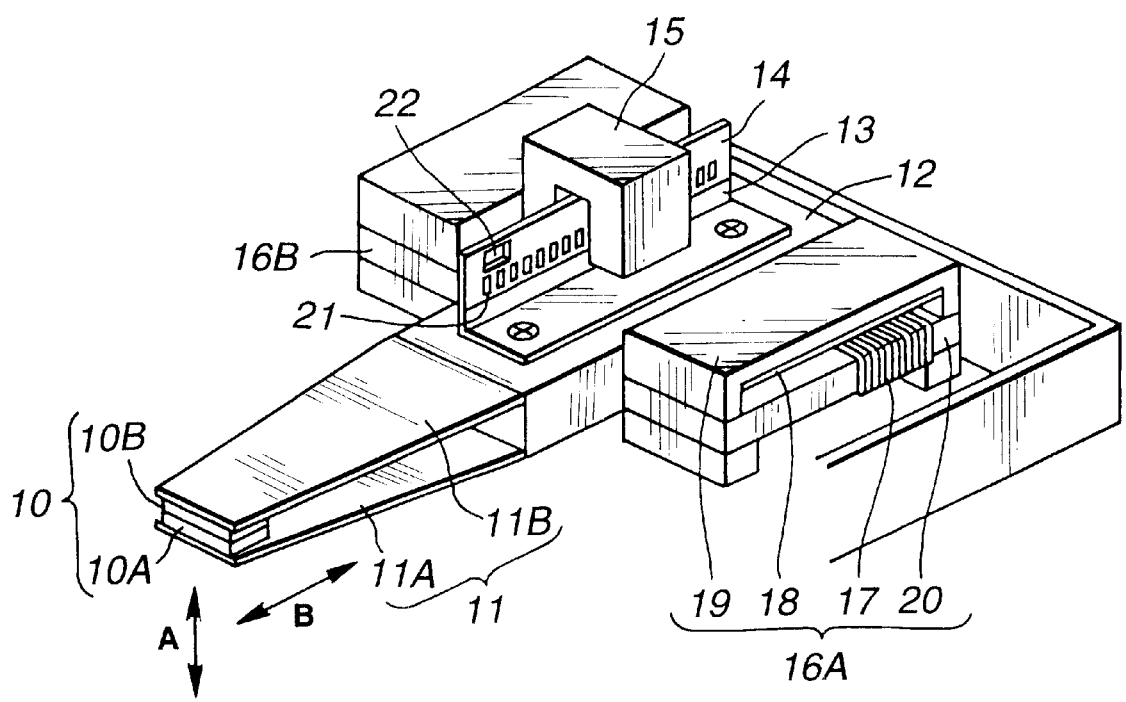
FIG. 2 is a perspective view showing a magnetic head portion provided on the recording/reproducing apparatus.

Referring to FIGS. 1 and 2, the recording/reproducing apparatus includes a magnetic head 10 for recording/reproducing information signals for a magnetic disc 200, a magnetic head driving unit 6 for causing movement of the magnetic head 10 in a direction perpendicular to plural data tracks on the magnetic disc 200 and a controller having the function of controlling various components. The magnetic disc 200 has plural data tracks formed concentrically so that the respective data tracks extend substantially parallel to one another.

The recording/reproducing apparatus 1 also includes a disc supporting unit 3 for rotatably supporting the magnetic disc 200, a disc driving unit 4 for driving the disc supporting unit 3, a magnetic head 5 for positioning the magnetic head 10 on a pre-set data track of the magnetic disc 200, a tracking controller 7 for controlling the tracking of the magnetic head 5 relative to the magnetic disc 200, a recording/reproducing unit 8 for recording/reproducing the magnetic disc 200 by the magnetic head 5, and a discriminating unit 2 for controlling the disc supporting unit 3 depending on the sort of the magnetic disc 200 loaded on the disc supporting unit 3. The recording/reproducing apparatus 1 also includes and a memory 25 for storage of various data and a disc controller 31 having an interfacing function.

The controller 9 includes a counter 9a, as track feed requesting signal counting means for counting the track feed requesting pulses responsive to the oncoming track feed requesting pulses, a head movable state detection unit 9b for detecting the movable state of the magnetic head 10, and a track feed controller 9c for controlling the magnetic head driving unit 6 to effect track feed of the magnetic head 10.

Figure 3:
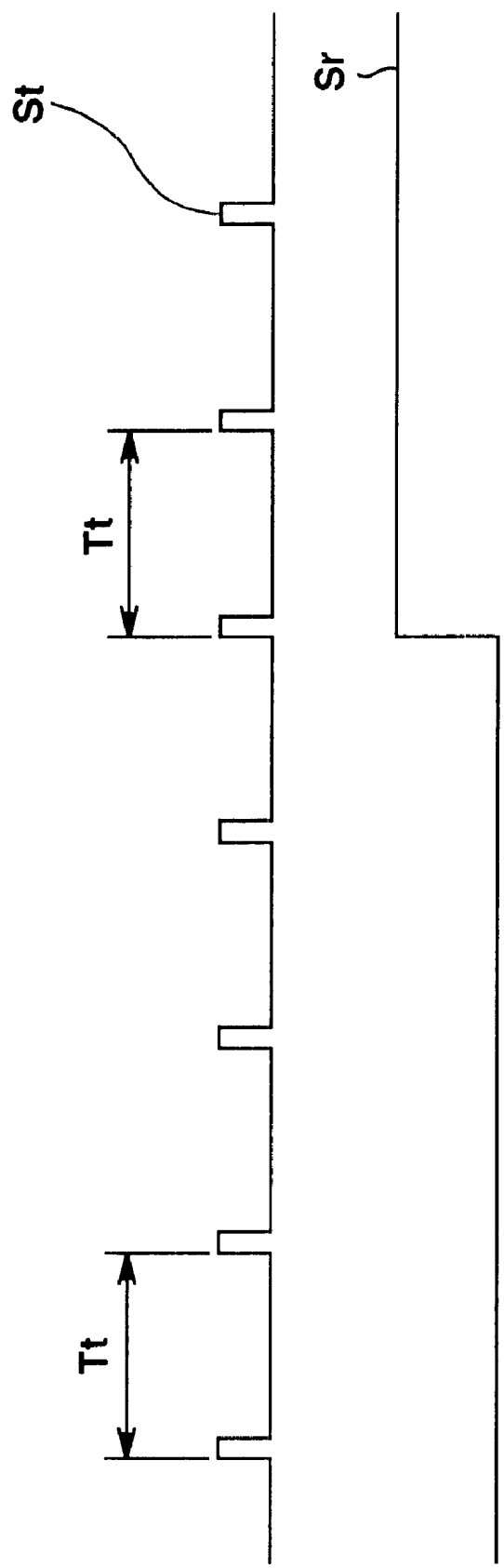
FIG. 3 shows a track feed requesting pulse for continuous track feed in the recording/reproducing apparatus.

To this recording/reproducing apparatus 1 is connected an external computer 300 via the disc controller 31. The track feed requesting pulses are signals oncoming from the external computer 300 connected to the recording/reproducing apparatus 1. The track feed requesting pulses, thus fed from the external computer 300, are counted by a counter 9a of the controller 9 of the recording/reproducing apparatus. If the continuous track feed is requested, the external computer 300 outputs track feed requesting pulse St, as indicated in FIG. 3.

The above-mentioned various components, making up the recording/reproducing apparatus, are explained in detail.

The disc supporting unit 3 is comprised of, for example, a spindle motor, and rotatably supports the detachably mounted magnetic disc 200. This disc supporting unit 3 rotationally drives the magnetic disc 200 at different rotational speeds depending on driving signals from the disc driving unit 4.

The disc driving unit 4 outputs driving signals rotationally driving the magnetic disc 200 loaded on the disc supporting unit 3 to the disc supporting unit 3. The disc supporting unit 3 is connected to the discriminating unit 2 adapted to output rotation control signals responsive to the magnetic disc 200 loaded on the disc supporting unit 3, and has its rotation controlled responsive to the rotation control signals from the discriminating unit 2. That is, the discriminating unit 2 discriminates the magnetic disc 200 loaded on the disc supporting unit 3, from the control signals outputted by the controller 9, to control the rotational speed of the disc supporting unit 3 by the rotation control signals associated with the magnetic disc 200.

Specifically, the discriminating unit 2 generates rotation control signals rotationally driving the magnetic disc loaded on the disc supporting unit 3, if it decides that the disc 200 is the lower-order disc. If the discriminating unit 2 decides that the magnetic disc 200 loaded on the disc supporting unit 3 is the upper-order disc, it generates rotation control signals rotationally driving the disc at the rotational speed for the upper-order disc. That is, if the upper-order disc is loaded on the disc supporting unit 3, the discriminating unit 2 causes the upper-order disc to be rotated by the disc supporting unit 3 at a rotational speed higher than that for the lower-order disc.

Referring to FIG. 2, the magnetic head unit 5 includes movement units 16A, 16B making up the magnetic head driving unit 6 driving the magnetic head 10, a head carriage 12 driven along the radius of the disc by this movement unit 16A, a gauge holder 13 mounted on the head carriage 12, a track gauge 14 mounted on the head carriage 12 via the gauge holder 13, and an optical encoder 15 fixedly mounted on a stationary unit, not shown. The magnetic head unit also includes an arm unit 11, made up of arms 11A, 11B and having its proximal end supported by the head carriage 12, and a magnetic head 10, mounted on the free ends of the arms 11A, 11B of the arm unit 11 and adapted for recording/reproducing information signals for the magnetic disc 200.

The magnetic heads 10A, 10B each include a lower-order gap for recording/reproducing information signals for the lower-order disc, and an upper-order gap for recording/reproducing information signals for the upper-order disc, although these gaps are not shown. For recording on the magnetic disc 200, the magnetic head 10 is fed with recording signals from the recording/reproducing unit 8 to record information signals on the lower-order disc or the upper-order disc. For reproducing the information signals recorded on the magnetic disc 200, the playback signals corresponding to the information signals are outputted to the recording/reproducing unit 8.

The arms 11A, 11B of the arm unit 11 are substantially sheet-shaped and are mounted on the head carriage 12 for movement along the direction A facing each other, that is along the direction towards and away from the signal recording surfaces of the magnetic disc 200. The arms 11A, 11B support the heads 10A, 10B in position above the magnetic disc 200 and are mounted on the head carriage 12 so that a pre-set thrusting load will be applied by the magnetic heads 10A, 10B on the magnetic disc 200. Specifically, in recording/reproducing the lower-order disc by the magnetic heads 10A, 10B, there is applied a load which will cause the magnetic heads 10A, 10B to be contacted with the magnetic disc 200 with a pre-set thrusting load. On the other hand, in recording/reproducing the upper-order disc, there is applied a load which will cause the magnetic heads 10A, 10B to be floated away from the signal recording surface to record/reproduce information signals.

The movement unit 16A is constituted by a voice coil motor, constructed as a linear motor, and is made up of a voice coil motor coil 17, a magnet 18 and yokes 19, 20. The movement units 16A, 16B constitute the magnetic head driving unit 6 adapted for driving the magnetic head 10. Specifically, the movement unit 16A has the yokes 19, 20 secured to a chassis of the disc drive device, while having the magnet 18 mounted on the yoke 19. The yoke 20 is inserted through the voice coil motor coil 17 so that the voice coil motor coil 17 will be movable relative to the yoke 20. The magnet 18 is mounted on the inner lateral surface of the yoke 19 facing the yoke 20. If, with the movement unit 16A, constructed as described above, the voltage is applied across the voice coil motor coil 17, the voice coil motor coil 17 is driven relative to the yoke 20. The voice coil motor coil 17 of the movement unit 16A is mounted on the lateral side of the head carriage 12. The movement unit 16B, arranged facing the movement unit 16A with the head carriage 12 in-between, is constructed similarly to the movement unit 16A.

If, in the movement units 16A, 16B, the driving voltage is applied across the voice coil motor coil 17, the latter is driven to drive the head carriage 12 along the radius of the magnetic disc 200, as indicated by arrow B. That is, the arms 11A, 11B are moved in the direction indicated by arrow B to cause movement of the magnetic head 10 along the radius of the magnetic disc 200, as indicated by arrow B.

Specifically, the movement units 16A, 16B are driven by the head driving signals and the tracking signals supplied from the controller 9 and the tracking controller 7. The movement units 16A, 16B are responsive to the head driving signals to cause movement of the magnetic head 10 along the radius of the magnetic disc 200, as indicated by arrow B. The movement units 16A, 16B are also responsive to the tracking signals to effect tracking driving of the magnetic disc 200 along the radius of the magnetic disc 200, as indicated by arrow B. Meanwhile, data track feed of the magnetic head 10 by the movement units 16A, 16B is effected responsive to the track feed requesting pulses issued by the external computer 300.

The track gauge 14 is substantially sheet-shaped and is mounted on the head carriage 12 via gauge holder 13, as described above. The track gauge 14 is arranged on the head carriage 12 parallel to the radial direction B of the magnetic disc 200.

Figure 4A:
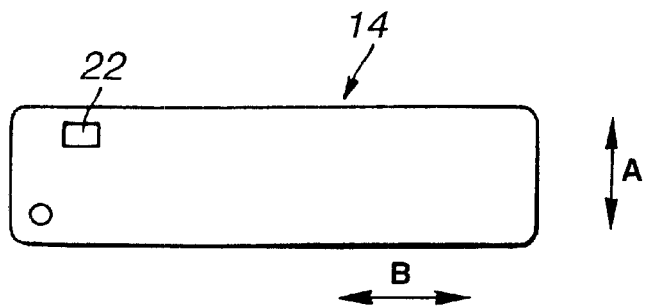
FIGS. 4a and 4b show an illustrative track gauge provided on the recording/reproducing apparatus, where
Figure 4B:
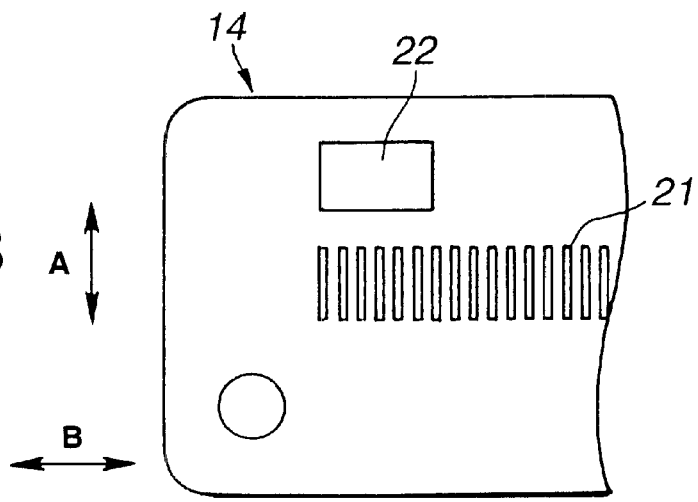

The track gauge 14 is formed with a plurality of first openings 21, arrayed in the radial direction B, and a second opening 22 towards the magnetic disc 10, as shown in FIGS. 4a and 4b.

Figure 5:
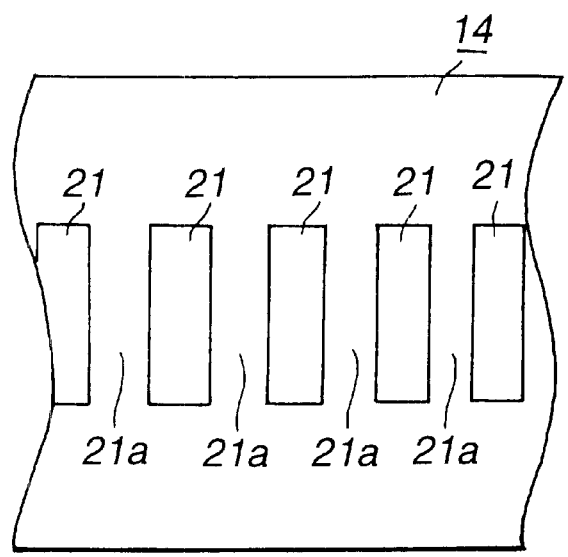
FIG. 5 is a plan view of the track gauge showing the second openings to an enlarged scale.

The first openings 21 are substantially coextensive and are rectangular in profile, as shown in FIG. 5. The first openings 21 are formed in the track gauge 14 at a pitch equal to the track pitch of the lower-order disc. The neighboring openings 21 are separated, from each other by a shielding area 21a adapted to shield the light from a light source 23. In the track gauge, the forming area of the first openings 21 in the radial direction B is selected to be slightly broader than the width of the data track area on the magnetic disc 200.

The second opening 22 is provided in proximity to the array of the first openings 21 towards an edge of the array of the first openings 21. Specifically, the second opening 22 is provided in the track gauge 14 so that the second opening 22 will be positioned in the optical encoder 15 when the head carriage 12 is moved such that the magnetic head 10 is arranged on the outermost data track in the data track area of the magnetic disc 200. That is, the second opening 22 is provided in order to derive the information indicating that the magnetic head 10 is positioned at the outermost data track.

Since the track gauge 14 is mounted on the head carriage 12, the track gauge 14 is moved along the radial direction B, along with the head carriage 12, by the head driving signals and the tracking signals from the controller 9 and the tracking controller 7.

Figure 6:
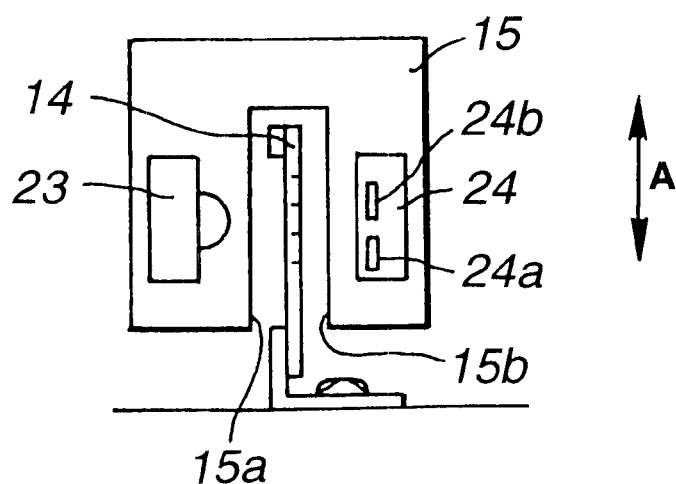
FIG. 6 is a front view showing the structure of an optical encoder provided on the recording/reproducing apparatus.

The optical encoder 15 includes a light source 23 and an optical sensor 24 lying on both sides of the track gauge 14, as shown in FIG. 6. This optical encoder 15 is secured by securing means, not shown, that is, the optical encoder 15 is adapted to be moved relative to the movement of the track gauge 14.

The light source 23 is a light emitting diode (LED), as an example, and is arranged on an inner lateral side 15a of the optical encoder 15. The optical sensor 24 is, for example, a phototransistor, and is arranged on another inner lateral side 15b facing the inner lateral side 15a. By light emission of the light source 23 provided in the optical encoder 15, the light is received via the first openings 21 or the second opening 22 provided in the track gauge 14 lying opposite to the light source 23.

Figure 7:
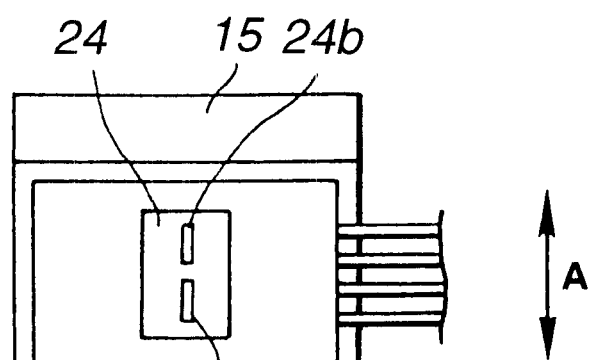
FIG. 7 is a side view showing the optical encoder looking from its inner lateral side.

Specifically, the optical sensor 24 includes a first phototransistor 24a, lying at an area of receiving the light from the light source 23 transmitted through the first openings 21, and a second phototransistor 24b, lying at an area of receiving the light from the light source 23 transmitted through the second opening 22, as shown in FIGS. 6 and 7.

With the above-described optical encoder 15, if the head carriage 12 is moved along the radial direction B, the light from the light source 23 generates sinusoidal optical signals via the track gauge 14.

The manner in which the light from the light source 23 is received by the optical sensor 24 when the head carriage 12 is moved, that is when the track gauge 14 is moved relative to the optical encoder 15 is moved, is now explained.

The light from the light source 23 is received by the optical sensor 24 with driving of the head carriage 12. That is, the movement units 16A, 16B are driven responsive to the head driving signals from the controller 9 to drive the head carriage 12. As the magnetic head 10 and the track gauge 14 are moved along the radial direction of the magnetic disc 200, the light from the light source 23 is received by the optical sensor 24 in the optical encoder 15 during movement of the track gauge 14.

During this movement, the first openings 21 and the shielding area 21a are alternately passed through the area between the light source 23 and the optical sensor 24. Thus, the first phototransistor 24a receives the light from the light source 23 varying in intensity due to passage of the first openings 21 and the shielding area 21a to generate a substantially sinusoidal first optical signal $S_a$, as shown in FIG. 8.

Figure 8:
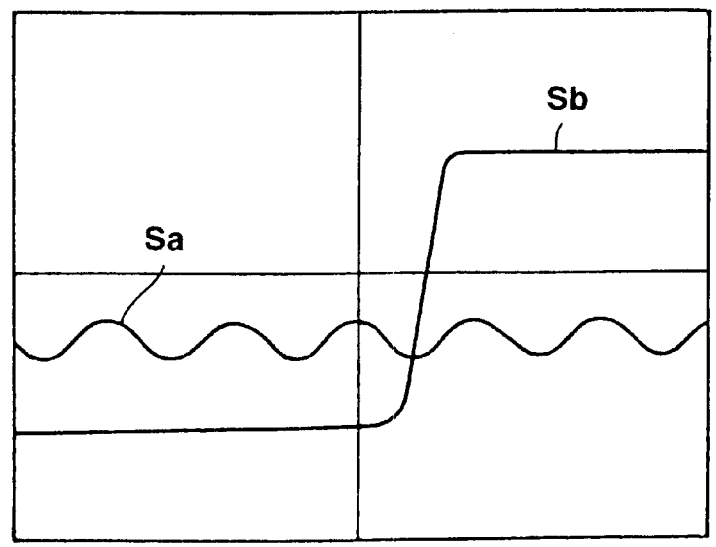
FIG. 8 is a graph showing a first optical signal and its changes when a magnetic head provided on the recording/reproducing apparatus is moved from the inner to the outer peripheral sides of the magnetic disc.

In the second phototransistor 24b, if the magnetic head 10 is moved towards the outer rim of the disc, a substantially sinusoidal second optical signal $S_b$, varying in intensity as a step signal, as shown in FIG. 8, is generated by the passage of the second opening 22 of the track gauge 14. It should be noted that the rise of the step signal of the second optical signal $S_b$ signifies that the magnetic head 10 has been positioned on the outermost data track in the data track area.

Therefore, by the second optical signal $S_b$, the data track lying at the outermost rim of the data track area is specified and, by the first optical signal $S_a$, the positions of the data tracks formed in the data track area are specified. The so-called absolute position at a time the second optical signal $S_b$ rises in the from of a step signal is detected by the controller 9.

Figure 9:
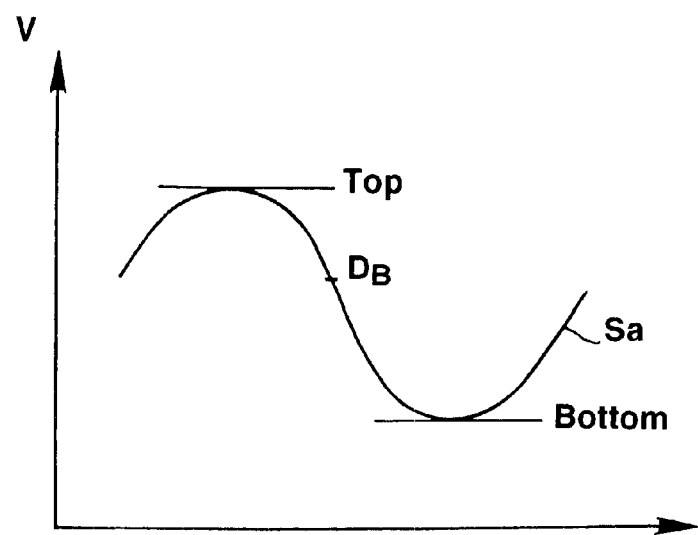
FIG. 9 shows top and bottom values of the first optical signal stored in a memory of the recording/reproducing apparatus.

Thus, in the optical encoder 15, the light from the light source 23 is received by the first phototransistor 24a and the second phototransistor 24b to generate optical signals. The position information on the respective data tracks of the lower-order disc is generated on the basis of the so-generated optical signals. Specifically, the top and bottom values of the first optical signal $S_a$ shown in FIG. 9 are stored in the memory 25 every period of the sine wave. In the memory 25, there are provided two memory areas for storage of the top and bottom values, so that the top and bottom values are recorded sequentially in these storage areas in associated with the respective data tracks.

In the following description of the present embodiment, the zero-crossing point of the first optical signal $S_a$ is the data track center, with one period as from the zero-crossing point being a track pitch. Therefore, each one top value and bottom value are associated with each data track.

As for the position in the data track area of the magnetic head 10, the data track number of the data track in which the magnetic head is currently positioned is detected by counting the top or bottom values of the first optical signal $S_a$ from the optical encoder 15. The sequence in which the position information is derived from the top and bottom values stored in the memory 25 in the course of the track feed will be explained subsequently.

Figure 10A:
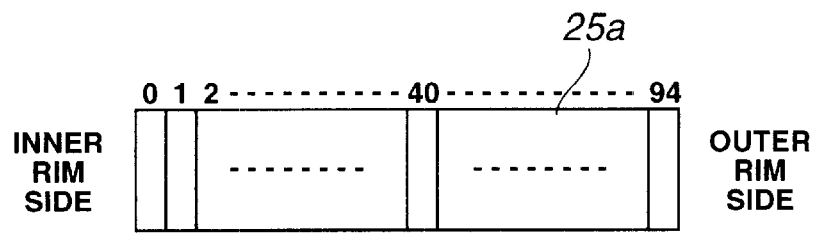
FIGS. 10a and 10b show memory areas for storage of the top and bottom values in the memory of the recording/reproducing apparatus.
Figure 10B:
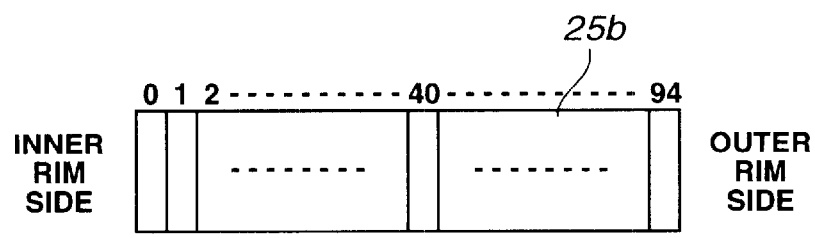

Specifically, the storage area of the memory 25 includes a memory area 25a for storage of the top values and a memory area 25b for storage of the bottom values, as shown in FIG. 10. The memory area 25a for storage of the top values and the memory area 25b for storage of the bottom values are constructed for storage of 94 top values and 94 bottom values, respectively. In the present embodiment, the data track area of the lower-order disc is made up of 80 data tracks. That is, there is provided in the memory 25 a storage area sufficient to store the top and bottom values associated with the respective data tracks.

The operation of deriving the optical signals is performed only on loading the lower-order disc because the lower-order disc itself has no position information indicating the data track position.

By the, above position information, the magnetic head 10 is fed to a desired data track, at which time the recording/reproducing apparatus 1 effects tracking of the magnetic head 10 by the tracking controller 7.

The tracking controller 7 includes an upper-order tracking control circuit 7a adapted to perform tracking when the upper-order disc is loaded on the disc supporting unit 3 and a lower-order tracking control circuit 7b adapted to perform tracking when the lower-order disc is loaded on the disc supporting unit 3, as shown in FIG. 2.

The upper-order tracking control circuit 7a is adapted to perform tracking by the position information signals, such as tracking signals, pre-recorded on the data track of the upper-order disc. For example, tracking signals are recorded on the data tracks of the upper-order disc. The upper-order tracking control circuit 7a performs the tracking responsive to these tracking signals.

Figure 11:
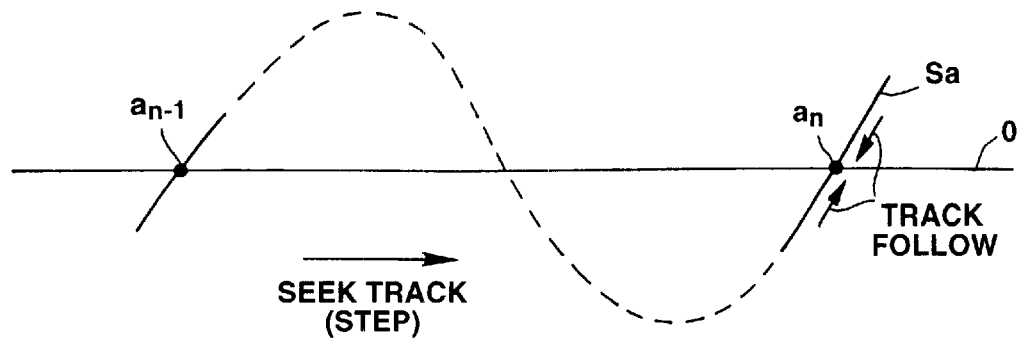
FIG. 11 is a graph for illustrating the track following of the recording/reproducing apparatus to a data track based on the first optical signal.

The lower-order tracking control circuit 7b performs tracking based on the above-mentioned first optical signal $S_a$ obtained on causing movement of the magnetic head 10 and a reference line O set to intersect the first optical signal $S_a$, as shown in FIG. 11. It is noted that the points of intersection of the first signal and the reference line O every period, that is zero-crossing points . . . , $a_{n-1}$, $a_n$, . . . , correspond to the center of the data tracks of the lower-order disc.

That is, the lower-order tracking control circuit 7b performs tracking by controlling the magnetic head 10 so that convergence to the zero-crossing point is achieved when the magnetic head 10 is moved to the desired data track, that is when the zero-crossing point associated with a pre-set data track is reached. This tracking operation is referred to hereinafter as track-follow.

In the tracking controller 7, constructed as described above, tracking signals can be generated by the upper-order tracking control circuit 7a or the lower-order tracking control circuit 7b based on the control signals from the controller 9.

Based on the control signals from the controller 9, the recording/reproducing unit 8 varies the data transfer rate etc responsive to the disc type, that is the upper-order disc or the lower-order disc, to effect recording/reproduction.

The disc controller 31 has the interfacing function with the external computer 300, as discussed above. For example, for this disc controller 31, any suitable conventional floppy disc controller for lower-order discs can be used.

The controller 9 has the function of controlling the disc driving unit 4, recording/reproducing unit 8, magnetic head driving unit 6 and the tracking controller 7 by outputting control signals thereto. The above-mentioned memory 25 is connected to the controller 9.

On loading the magnetic disc 200, the controller 9 detects the loading of the magnetic disc, 200 thereon to output control signals to the disc driving unit 4, magnetic head driving unit 6 and to the tracking controller 7. Based on the control signals outputted by the controller 9, the discriminating unit 2 outputs the rotation control signals appropriate to the magnetic disc 200 to the disc supporting unit 3.

The controller 9 includes the counter 9a, head movable state detection unit 9b and the track feed controller 9c.

The counter 9a is constructed to count the track feed requesting pulses sent from the external computer 300. Meanwhile the controller 9 holds this counter 9a as the software.

Specifically, the counter 9a is designed to count up the track feed requesting pulses requesting track feed towards the inner rim of the disc (track feed requesting pulses in the forward direction) and to count down the track feed requesting pulses towards the outer rim of the disc (track feed requesting pulses in the reverse direction). That is, the counter 9a increments or decrements the counter values responsive to the oncoming track feed requesting pulses in the forward direction and those in the reverse direction, respectively. The track feed requesting pulses in the forward direction and those in the re-verse direction, supplied from the external computer 300, the signals are varied from the positive direction to the reverse direction, in meeting with the track feed requesting direction, by inversion of the switching signal Sr, as shown in FIG. 3. Therefore, the recording/reproducing apparatus 1 detects the change in the track feed direction after time $T_t$ which is the time interval of the oncoming track feed requesting pulses St.

The head movable state detection unit 9b is the portion adapted for detecting the movable state of the magnetic head 10. By this head movable state detection unit 9b, the controller 9 detects that the magnetic head 10 has been unlocked by the loading of the magnetic disc to detect that the magnetic head is in the movable state.

The track feed controller 9c is the portion controlling the magnetic head driving unit 6 responsive to the counter value held by the counter 9a to control the track feed of the magnetic head 10.

The controller 9 counts down the count value held by the counter 9a each time track feed for one data track comes to a close. That is, the controller 9 is responsive to the oncoming track feed requesting pulses to increment or decrement the count value in the counter 9a and to count down the count value each time one data track comes to a close.

When the movable state of the magnetic head is detected by the head movable state detection unit 9b, the controller 9, having the counter 9a, head movable state detection unit 9b and the track feed controller 9c, feeds the magnetic head 10 by the track feed controller 9c on the track basis to reset the count value held by the counter 9a to zero. That is, if the track feed requesting pulses in the forward and reverse directions arrive during the time the magnetic head 10 is in the immovable state, the controller causes the counter value held by the counter 9a to be incremented or decremented responsive to the oncoming track feed requesting pulses, so that, when the magnetic head 10 is in the movable state, the controller 9 causes the track feed of the magnetic head 10 based on the count value of the counter 9a.

The various portions and circuits of the recording/reproducing apparatus 1 are constructed as described above. This recording/reproducing apparatus 1 is constructed to enable the track position information to be formulated for the lower-order disc as described above and, specifically, formulates the track position information for the lower-order disc on its insertion. The operation of the recording/reproducing apparatus 1 on loading the lower-order disc therein is hereinafter explained.

If the lower-order disc is loaded on the disc supporting unit 3, the recording/reproducing apparatus unlocks the magnetic disc 10 and transiently shifts the magnetic head 10 towards the inner rim of the lower-order disc. The magnetic head 10 is then moved towards the outer rim of the lower-order disc. For driving the magnetic head 10, the recording/reproducing apparatus used pre-set driving signals.

This movement of the magnetic head 10 towards the outer rim of the lower-order disc achieves pull-in of the first optical signal $S_a$ as shown in FIG. 8. The recording/reproducing apparatus 1 stores the top and bottom values in the pulled-in first optical signal $S_a$ in a pre-set storage area of the memory 25. The top and bottom values are stored in the respective memory areas in association with the respective data tracks.

The recording/reproducing apparatus 1 is in a stand-by state until the track feed requesting pulses are fed from the external computer 300. The recording/reproducing apparatus 1 detects, by the controller 9, that the track feed requesting pulses have arrived from the external computer 300, and causes the controller 9 to output the control signals corresponding to the track feed requesting pulses to the magnetic head driving unit 6.

The feed of the magnetic head 10 to the neighboring data track in case a request for one track feed is made, specifically the feed of the magnetic head 10 on the track basis towards the outer rim of the disc, is hereinafter explained.

Figures 12, 13:
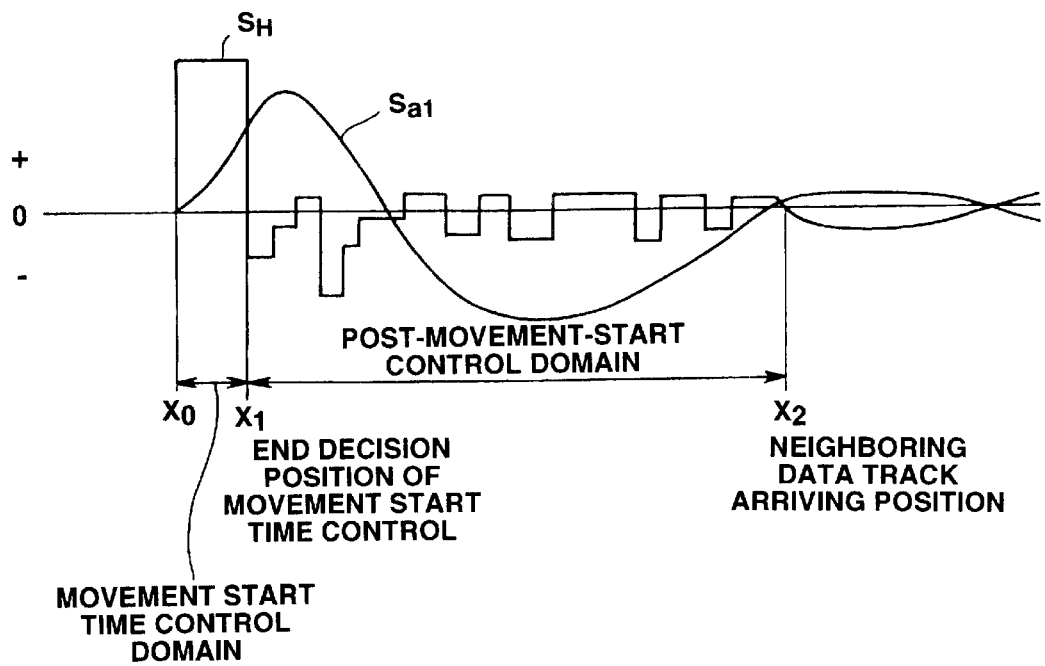
FIG. 12 shows the hysteresis of a head driving signal and the first optical signal when the movement speed of the magnetic head is controlled, based on the first optical signal obtained from the optical encoder to cause movement of the magnetic head to a neighboring data track in case the magnetic head is fed between data tracks.
FIG. 13 shows a speed profile used in controlling the movement speed of the magnetic head fed between tracks.

Referring to FIG. 12, the controller 9 performs control for starting the movement for a movement start control domain (from position $X_0$ to position $X_1$ in FIG. 12) in a manner different from driving control for a post-movement-start control domain (from position $X_1$ to position $X_2$ in FIG. 12) to cause the magnetic head 10 to arrive at the neighboring data track.

First, the controller 9 controls the magnetic head driving unit 6 so that the magnetic head driving unit 6 will unconditionally output a head driving signal of the maximum driving power in the direction conforming to the track feed requesting pulses which have arrived via the disc controller 31. That is, there is outputted a head driving signal SH as a kick pulse applying the maximum driving power which causes the start of the movement of the magnetic head 10, as shown in FIG. 10.

The controller 9 holds the head driving signal $S_H$ to control the magnetic head driving unit 6 until the magnetic head 10 arrives at the pre-set position $X_1$. Meanwhile, the pre-set distance, holding the head driving signal $S_H$ for applying this maximum driving power, is set to a value necessary and sufficient to permit the magnetic head to reach the neighboring data track. That is, the controller 9 starts the driving of the magnetic head 10 up to a pre-set position between a source data track and a destination data track by a pre-set driving power in the post-movement start control domain unconditionally without employing speed control. Thus, the magnetic head arrives at a pre-set position and at a pre-set initial movement speed.

The plus value and the minus value of the head driving signal $S_H$ represent a signal for applying a driving power for moving the magnetic head 10 towards the outer rim of the disc (in the forward direction) and a signal for applying a driving power for moving the magnetic head 10 towards the inner rim of the disc (in the reverse direction). Thus, if the track feed is in a direction towards the outer rim of the disc, as in the present embodiment, the change in the head driving signal $S_H$ to the plus direction and that in the head driving signal $S_H$ to the minus direction indicate acceleration and deceleration of the magnetic head 10, respectively.

By this movement of the magnetic head 10, the optical encoder 15 outputs a first optical signal $S_{a1}$ (change in the head driving signal $S_H$ as from the position $X_0$) indicating the driving of the magnetic head 10. During the post-movement-start control domain, following the movement start control domain, the controller 9 controls the movement speed of the magnetic head 10 based on the first optical signal $S_{a1}$ outputted by the optical encoder 15. That is, in the post-movement-start control domain, the controller 9 causes the kick pulse applying the above-mentioned maximum driving power to decay and subsequently performs servo control of the movement speed of the magnetic head 10 based on the first optical signal $S_{a1}$. During the post-movement-start control domain, the controller 9 controls the movement of the magnetic head 10 as it monitors the position of the magnetic head 10 at a pre-set time interval.

For example, the controller 9 performs speed control as it monitors the position of the magnetic head 10 at a constant time interval of 0.24 msec.

Specifically, the driving of the magnetic head 10 in the course of the post-movement-start control domain is performed by controlling the speed of movement of the magnetic head 10 based on the comparison between the pre-set speed profile and the actual movement speed of the magnetic head 10.

For example, the speed profile is constituted by a so-called expected speed table indicating the, current position and the expected speed associated with the current position. The current position is that of the magnetic head 10 between the source data track and the destination data track. The expected data speed is the so-called ideal speed at the current position, that is such a speed necessary and sufficient for the magnetic head 10 lying at the current position associated with the expected speed and travelling at the expected speed to arrive at the scheduled neighboring data track. The speed profile is stored in the memory 25. Meanwhile, the decaying of the kick pulse is caused to occur at a position "8" of the positions "0" to "30" obtained on division by 40 of the distance between the data tracks as later explained and subsequently the movement speed of the magnetic head 10 is servo-controlled on the basis of the first optical signal Sa1.

The controller 9 refers to the speed profile to control the movement speed of the magnetic head 10 so that the speed of the magnetic head when at the current position will be the above-mentioned expected speed. That is, the controller 9 refers to the speed profile to select the ideal movement speed based on the current position to control the movement of the magnetic head 10 so that the selected movement speed will be reached.

Figure 14:
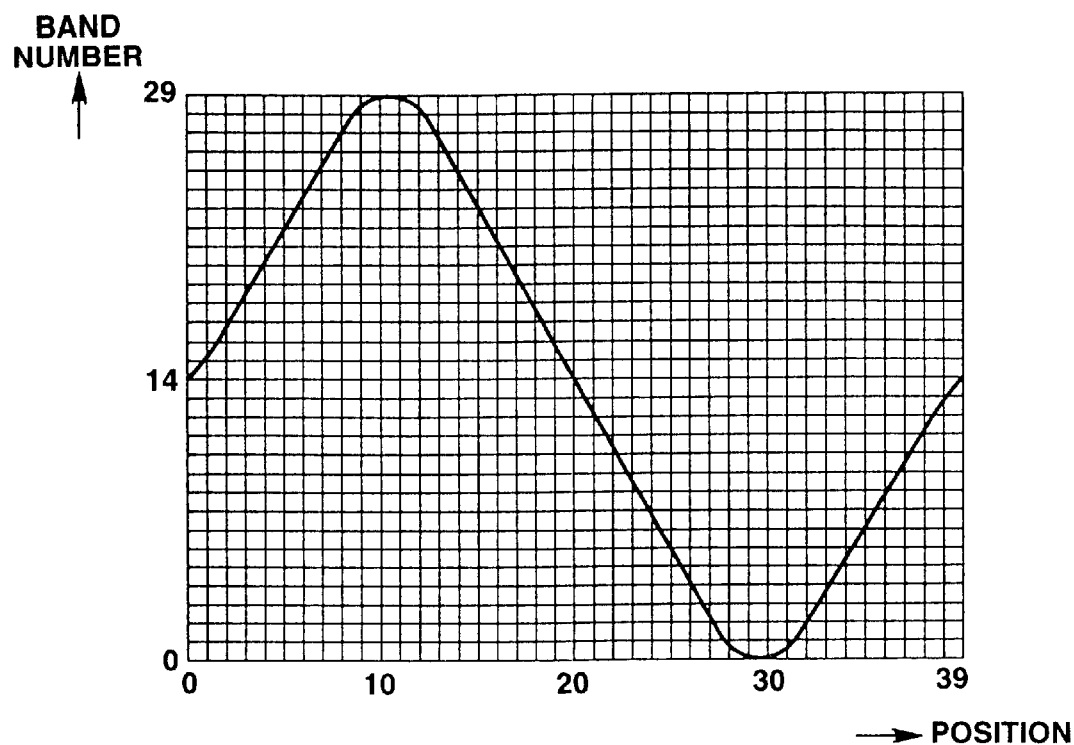
FIG. 14 shows a position information table plotting a sine wave signal obtained from the top and bottom values stored in the memory and on normalizing.

Specifically, the controller 9 finds the current position of the magnetic head 10 between the source data track and the destination data track, from the position information table, and refers to the speed profile and the current position as found from the position information table to control the movement of the magnetic head 10. Meanwhile, the position information table is such a table which is generated by reading out the top and bottom values associated with the positions of the magnetic head between neigh boring data tracks from the memory 25 and by normalizing these values to form a one-cycle sine waveform as indicated in FIG. 14. That is, a sine wave signal substantially similar to that obtained by an initial pull-in has now been generated from the top and bottom values stored in the memory 25 after the initial pull-in. Specifically, this waveform represents a quantized table. In FIG. 14, the abscissa and the ordinate denote the position in the data track and the quantized band values, respectively. The band value and the position are divided in equal intervals, specifically, in 30 stages of from 0 to 29 and in 40 stages of from 0 to 39, respectively. In this manner, each band value is associated with each of one-fortieths of a data track width. In the present embodiment, the zero-crossing point is the data track center, with one cycle corresponding to the source data track and the destination data track. That is, the position information table shown in FIG. 14 indicates respective positions between two neighboring data tracks.

Figure 15:
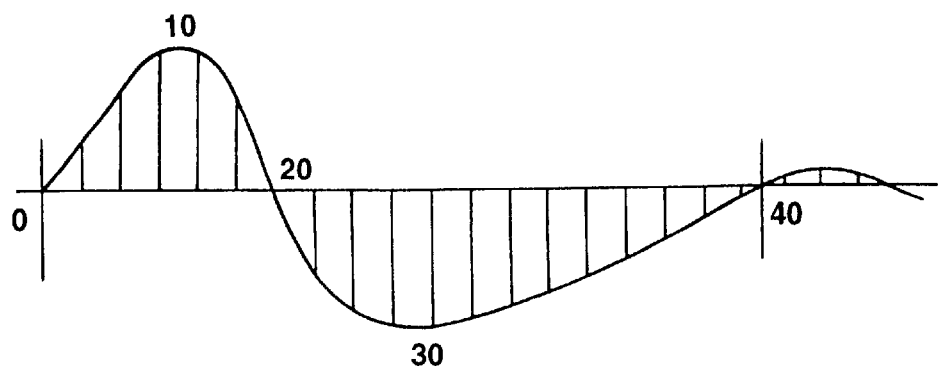
FIG. 15 shows an example of sampling of the first optical signals outputted by the optical encoder.

Thus, the position between the two neighboring data tracks can be known by comparing the band value and the value of the first optical signal Sa1 obtained by the magnetic head 10 actually being moved on the data track. It is noted that the first optical signal $S_{a1}$ is monitored at a pre-set time interval such that the position in the data track in which the magnetic head 10 is currently positioned is detected by, for example, voltage values, as shown in FIG. 15. Thus, the actually obtained first optical signal $S_a$ is converted into digital signal by a D/A converter, not shown, for comparison in the position information table shown in FIG. 14. The first optical signal $S_a$ is monitored at an interval of 0.24 msec.

In more detail, if a digital value $D_B$ is obtained in the first optical signal $S_a$, the band number is calculated from the digital value DB in accordance with the equation (1), as shown in FIG. 9:

(Band number)=(bottom value/((top value−bottom value)/30)  (1).

Based on the band number obtained from the equation (1), that is the band number indicating the actual position of the magnetic head 10, the position corresponding to the band value can be obtained by having reference to the position information table, obtained previously, as shown in FIG. 14.

Thus, the position of the magnetic head 10 in the data track can be correctly detected on the basis of the first optical signal $S_a$ obtained on actually moving the magnetic head 10 and the top and bottom values stored from the outset in the memory 25.

The controller 9 calculates the actual movement speed of the magnetic head 10 (speed under measurement) from the detected position to compare the calculated actual movement speed to the expected speed of the speed profile. Since the first optical signal Sa outputted from the optical encoder 15 is monitored at a pre-set time interval, the speed under measurement is calculated from the difference value. That is, the first optical signal $S_a$ is monitored at a pre-set time interval, as shown in FIG. 15, the position of the magnetic head 10 is detected from the position information table as described above and the speed under measurement is calculated by dividing the position by the above-mentioned pre-set time interval. That is, the speed under measurement= (position at the current time−position before one unit time)/ Δt, where Δt is the above-mentioned pre-set time interval which is 0.24 msec.

Figure 16:
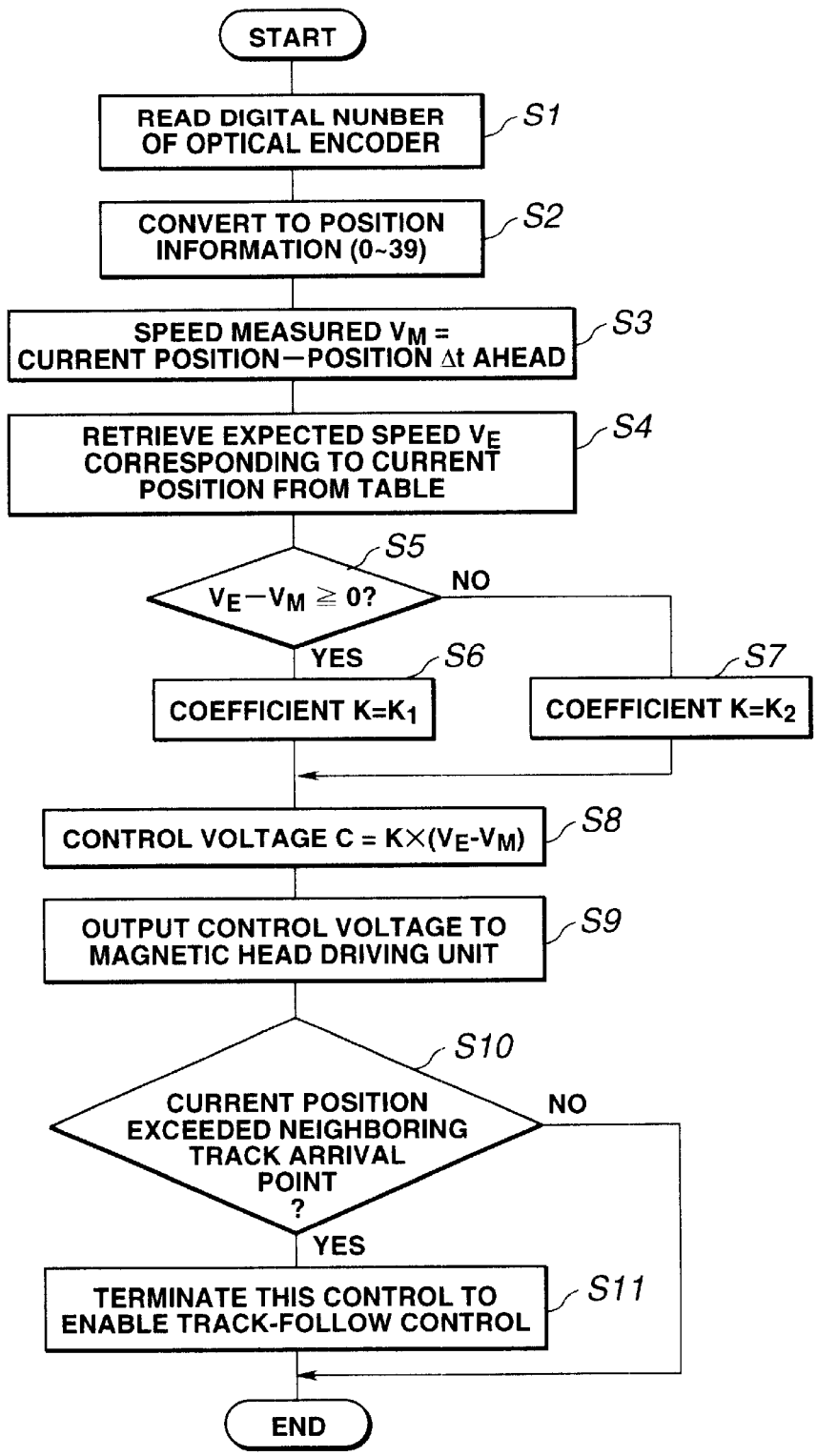
FIG. 16 is a flowchart for executing the feed of the magnetic head to a neighboring data track by controlling the speed of movement of the magnetic head.

The speed under measurement is compared to the expected speed to perform control so that the magnetic head 10 will be reliably moved to the neighboring data track. The movement speed of the magnetic head 10 in each position is controlled in accordance with the flowchart shown in FIG. 16.

First, at step S1, the digital number from the optical encoder 15 (quantized first optical signal $S_B$) is read out. Then, at step S2, the top and bottom values are read out from the memory 25 to generate the above-mentioned position information (0 to 39) on the normalized one-cycle sine wave.

At step S3, the speed under measurement is calculated. That is, the speed under measurement $V_M$=(current position−position Δt ahead)/Δt is found. Then, at the next step S4, the expected speed $V_E$ corresponding to the current position is retrieved from the table (speed profile).

At steps S5 to S7, a coefficient K is selected from the relation between the expected speed $V_E$ and the speed under measurement $V_M$. The coefficient K is a gain or a parameter which denotes the intensity of control. Thus, in the present embodiment, since the coefficient is determined by decision at steps S5 to S7, it is determined in dependence upon the speed.

After the coefficient K is determined, the control signal C outputted by the controller 9 to the magnetic head driving unit 6 is calculated by C=K X ($V_E$−$V_M$). It is noted that the control signal C is a signed signal, such that, if $V_E$<$V_M$, that is if the speed under measurement is larger than the expected speed, it is a negative value, whereas, if $V_E$>$V_M$, that is if the speed under measurement is smaller than the expected speed, it is a positive value.

The control signal C, obtained by the step S8, is outputted to the magnetic head driving unit 6. The magnetic head driving unit 6 controls the driving of the magnetic head 10 by the head driving signal derived from the control signal C from the controller 9. If the control signal C is a negative signal, that is if the speed under measurement is larger than the expected speed, the magnetic head driving unit 6 drives the magnetic head 10 in the reverse direction in meeting with the magnitude of the control signal C. If the control signal C is a positive signal, that is if the speed under measurement is smaller than the expected speed, the magnetic head driving unit 6 drives the magnetic head 10 in the forward direction in meeting with the magnitude of the control signal C. If $V_E$=$V_M$, the magnetic head driving unit 6 reduces the driving power applied to the magnetic head 10 to zero. By this driving control by the magnetic head driving unit 6, the magnetic head 10 is smoothly decelerated towards the pre-set data track.

At step S10, the magnetic head 10 verifies whether or not the current position of the magnetic head 10 has exceeded the destination arrival point of the neighboring data track. If the current position is verified to have exceeded the neighboring data track position, the control to feed the magnetic head to this neighboring data track is terminated to perform the above-mentioned track-follow. If the current position has not exceeded the destination arrival point on the neighboring data track, the processing is terminated.

Since, the movement speed of the magnetic head 10 is controlled after the magnetic head 10 has reached the pre-set sped by the above-mentioned kick pulse, the head driving signal SH of the post-movement-start control domain (X1 to X2) is varied, as shown in FIG. 12.

Thus, the magnetic head 10 starts to be driven by the driving power for starting the magnetic head driving, as the kick pulse, responsive to the track feed requesting pulses, and subsequently the position and the movement speed of the magnetic head 10, started to be driven, are monitored, to control the movement speed, thus realizing the arrival of the magnetic head at the pre-set data track.

The recording/reproducing apparatus 1 performs track-follow control of the magnetic head 10, sent to the pre-set data track by the above control, with respect to this data track. That is, the recording/reproducing apparatus 1 sets the magnetic head 10, fed by the track seek to the neighboring data track, to the desired position in the data track by the track-follow, as shown in FIG. 11. The lower-order tracking control circuit 7b is in the non-operating state when the track feed control is going on, as described above.

The continuous track feed by the track feed requesting pulses, oncoming continuously, as shown in FIG. 3, is explained. The controller 9 performs this continuous track feed of the magnetic head 10 by switching to one track feed mode, based on the transition of the current count value, by the track feed mode comprised of the pre-set speed profile.

The current count value is the count value which is counted up by the track feed requesting pulse oncoming from the external computer 300 and which is counted down each time the magnetic head is fed a distance corresponding to a data track. Thus, in the recording/reproducing apparatus 1, if the arrival of the track feed requesting pulses is detected, that is at the time of count-up of the count value, and on termination of the track feed, that is at the time of count-down of the count value, the current count value is changed to switch the track feed mode.

Meanwhile, the controller 9 monitors the output of the optical encoder 15 at a pre-set time interval. The controller 9 performs switching control of the track feed mode on the monitoring time unit basis. This monitoring unit time in the present embodiment is 0.24 msec.

Specifically, each track feed mode has a speed profile comprised of the positions on different data tracks and the speed associated with the different positions, and controls the movement speed of the magnetic head 10 in accordance with the speed profile, that is so that the desired movement speed will be reached as from the current speed.

There are three track feed modes, that is a single track feed mode accompanied by the control at the time of movement start of the magnetic head 10, referred to hereinafter as mode 0, a single track feed mode not accompanied by the control at the time of movement start of the magnetic head 10, referred to hereinafter as mode 1, and a constant-speed track feed mode of causing movement of the magnetic head 10, referred to hereinafter as the mode 2, as shown in FIG. 17.

The mode 0 is track feed mode a mode accompanied by the control at the time of movement start of the magnetic head 10, in which the magnetic head 10 is fed by one data track, as shown in FIG. 12. That is, the mode 0 is such a track feed mode in which the magnetic head 10 is started to be moved by the kick pulse and subsequently the movement speed of the magnetic head 10 is controlled by having reference to the expected speed table shown for example in FIG. 13. This mode 0 is started by the arrival of the first track feed requesting pulse.

The mode 1 is such a track feed mode in which control at the time of movement start of the magnetic head 10 is not needed, that is in which there is no kick pulse for starting the movement of the magnetic head 10, and in which the speed of the magnetic head 10 is controlled by having reference to the expected speed table in which a perpetually constant expected speed is designated. In the present embodiment, the mode 1 is the mode 0 less the movement start time control for starting the movement of the magnetic head 10 at the time of starting of the movement of the mode 0.

The mode 2 is such a track feed mode executed by having reference to the expected speed table in which a perpetually constant expected speed is designated. The control speed for the mode 2 is set so as to be faster than the maximum repetition speed of the track feed requesting pulses (3 msec/track). This enables smooth continuous track feed even if the track feed requesting pulses arrive at an arbitrary speed not in excess of the control speed.

Figure 18A:
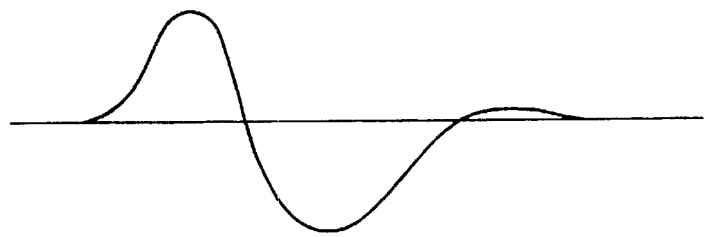
FIGS. 18a, 18b and 18c are graphs showing the speed curves obtained with the magnetic head movement control for each track feed mode.
Figure 18B:
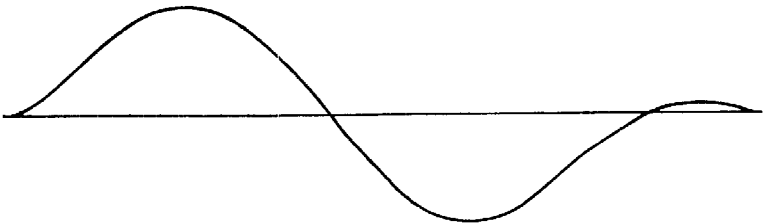
Figure 18C:
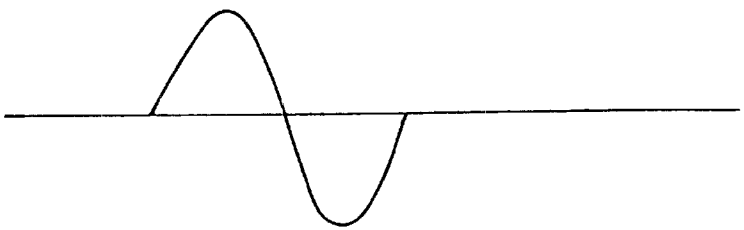

FIG. 18 shows an output of the optical encoder 15 when the above-mentioned track feed modes are executed, that is a so-called speed curve of the magnetic head 10. FIGS. 18a, 18b and 18c show speed curves of the magnetic head 10 in case the mode 1, mode 2 and the mode 3 are selected, respectively. Stated differently, the controller 9 executes the above-mentioned respective track feed modes by having reference to the expected speed table comprised of the current positions and expected speeds which conform to the above-mentioned speed curves.

Figure 19:
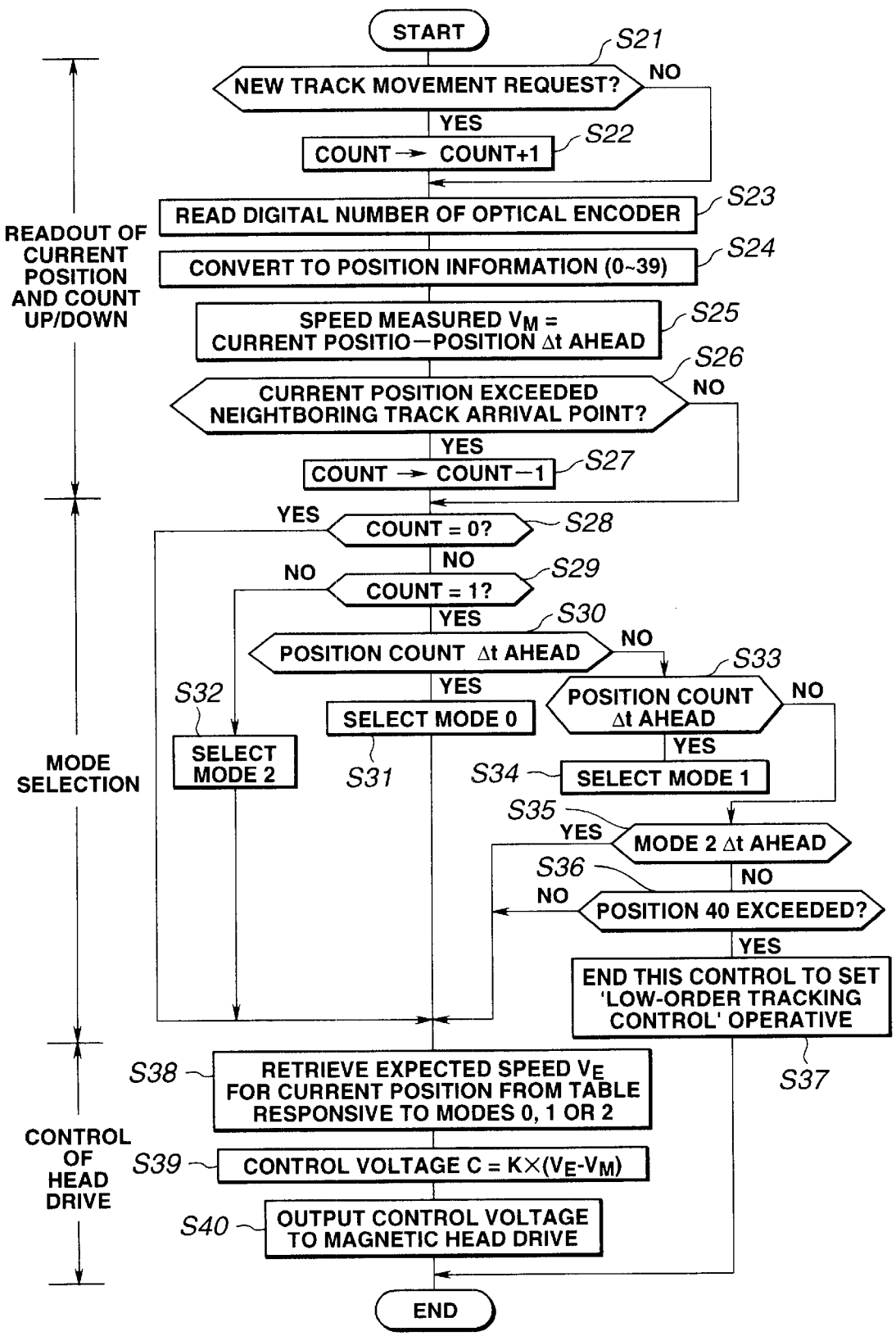
FIG. 19 is a flowchart showing the sequence of switching the track feed mode based on the transition of the current count value.

Referring to the flowchart of FIG. 19, selection of the track feed mode with the transition of the count values of the counter 9a of the controller 9 and control of the movement speed of the magnetic head 10 by the selected track feed mode are explained. It is assumed that the track feed requesting pulses arrive from the external computer 300 in succession at a constant track feed request time interval, as shown in FIG. 3.

The controller 9 at step S21 verifies if the track feed requesting pulse has arrived, that is if the track movement request has been made. If the arrival of the track feed requesting pulse is confirmed, the controller 9 at step S22 acquires the current count value by counting up the previous count value at the counter 9a, that is by counting up the current count value Δt ahead. The controller 9 then reads out at step S23 the digital value from the optical encoder 15 (digital value of the first optical signal Sa1). If the controller verifies that no track feed requesting pulse has arrived, the controller, 9 skips the step S22 to read out at step s23 the above-mentioned digital value from the optical encoder 15.

At the next step S24, the controller 9 converts the top and bottom values corresponding to the positions of the magnetic head 10 stored in the memory 25 into the position information to generate the position information table. Then, at step S25, the controller 9 calculates the speed under measurement $V_M$=(current position)−(position Δt ahead). That is, the processing at steps S23 to S25 is equivalent to that at steps S1 to S3.

The controller 9, which has acquired the speed under measurement $V_M$ at step S25, then verifies at the next step S26 whether or not the current position of the magnetic head 10 has passed over the destination point of the neighboring data track, that is the center of the neighboring data track. Specifically, the controller 9 verifies whether or not the first optical signal $S_a$ has passed over the zero-crossing point corresponding to the track center. If the controller 9 has confirmed that the first optical signal $S_a$ has passed over the destination point of the neighboring data track, the controller 9 cat step S27 counts down the previous count value to derive the current count value. The controller 9 then proceeds to step S28. If the controller 9 has confirmed that the first optical signal $S_a$ has passed over the destination point of the neighboring data track, the controller 9 skips the step S27 to proceed to step S28.

At step S28, the controller 9 verifies whether or not the current count value is 0. If the controller confirms that the current count value=0, it proceeds to step S38 and, if otherwise, to step S29.

At step s29, the controller 9 verifies whether or not the current count value=1. If the current count value=1 is confined, the controller 9 proceeds to step S30 and, if otherwise, to step S32.

At step S32, the controller selects the mode 2. That is, if the controller 9 confirms at S28 that the current count value is not zero and also confirms at S29 that the current count value is not 1, that is if the controller confirms that the transition of the current count value is not the transition from 0 to 1 nor the transition from 2 to 1, as shown in FIG. 17, the controller selects the mode 2 at step S32. The controller 9, which has selected the mode 2, proceeds to step S38.

At step S30, to which the controller 9 proceeds on confirming at step S29 that the current count value is 1, the controller 9 verifies whether or not the above-mentioned current count value Δt ahead, referred to hereinafter as the count value Δt ahead, is equal to 0. If it is confirmed that the count value Δt ahead is 0, the controller 9 proceeds to step S33. If it is it is confirmed that the count value Δt ahead is not 0, the controller 9 proceeds to step S31.

At step S31, the controller 9 selects the mode 0. That is, if the controller 9 confirms at step S29 that the current count value is equal to 1, while confirming at step S30 that the current value Δt ahead is equal to 0, that is that the current count value is changed from 1 to 0, as shown in FIG. 17, the controller 9 at step S31 selects the mode 0. The controller 9, which has selected the mode 0, proceeds to step S38.

If it is, confirmed at step S30 that the count value Δt ahead is not equal to zero, the controller, 33 at step S33 verifies whether or not the count value Δt ahead is equal to 2. If it is confirmed that the count value Δt ahead is equal to 2, the controller 9 proceeds to step S34. If it is confirmed that not the count value Δt ahead is not equal to 2, the controller 9 proceeds to step S35.

At the above step S34, the controller 9 selects the mode 1. That is, if it is confirmed at step S29 that the current count value is 1, while it is confirmed at steps S30 and S33 that the count value Δt ahead is 2, that is that the current count value is changed from 2 to 1, as shown in FIG. 17, the controller 9 selects the mode 1 at step S34. The controller 9, which has selected the mode 1, proceeds to step S38.

If it is conformed at step S33 that the count value Δt ahead is not equal to 2, the controller 9 at step S35 verifies whether or not the track feed mode Δt ahead is the mode 2. If it is confirmed that the track feed mode Δt ahead is not the mode 2, the controller 9 proceeds to step S36. If it is confirmed that the track feed mode Δt ahead is the mode 2, the controller 9 proceeds to step S38.

At this step S36, the controller 9 verifies whether or not the magnetic head 10 has passed over a position 40 (track center position of the neighboring data track shown in FIG. 14). If it is confirmed that the magnetic head 10 has not passed over the position 40, the controller 9 proceeds to step S38. If it is confirmed that the magnetic head 10 has passed over the position 40, the controller 9 proceeds to step S37 to set the lower-order tracking control circuit 7b to its operating state so that the track feed control is terminated to enable the prosecution of the track-follow control.

At step S38, the controller 9 performs the operation of retrieving the expected speed associated with the current position based on the expected speed table. The expected table is suitably switched at the steps S32, S31 and S34, in case of transition of the current count. Stated differently, the movement speed of the magnetic head 10 is controlled with the same track feed mode as the track feed mode Δt ahead, insofar as the current count value is not changed.

The controller 9, which has retrieved the expected speed from the speed profile, proceeds to step S39 to calculate the control voltage $C = K \times (V_E - V_M)$. At the next step, the controller 9 outputs the control signal C to the magnetic head driving unit 6. The calculations at step S38 and S39 are equivalent to those at S8 and S9 in FIG. 16. That is, the controller 9 finds the control signal for the magnetic head driving signal responsive to the difference between the expected speed $V_E$ and the speed under measurement $V_M$. Thus, if the speed under measurement $V_M$ is found to be larger than the expected speed $V_E$, a magnetic head driving signal which will decelerate the magnetic head 10 is produced, whereas, if it is the speed under measurement $V_M$ that is smaller, a magnetic head driving signal which will accelerate the magnetic head 10 is produced.

Figure 20:
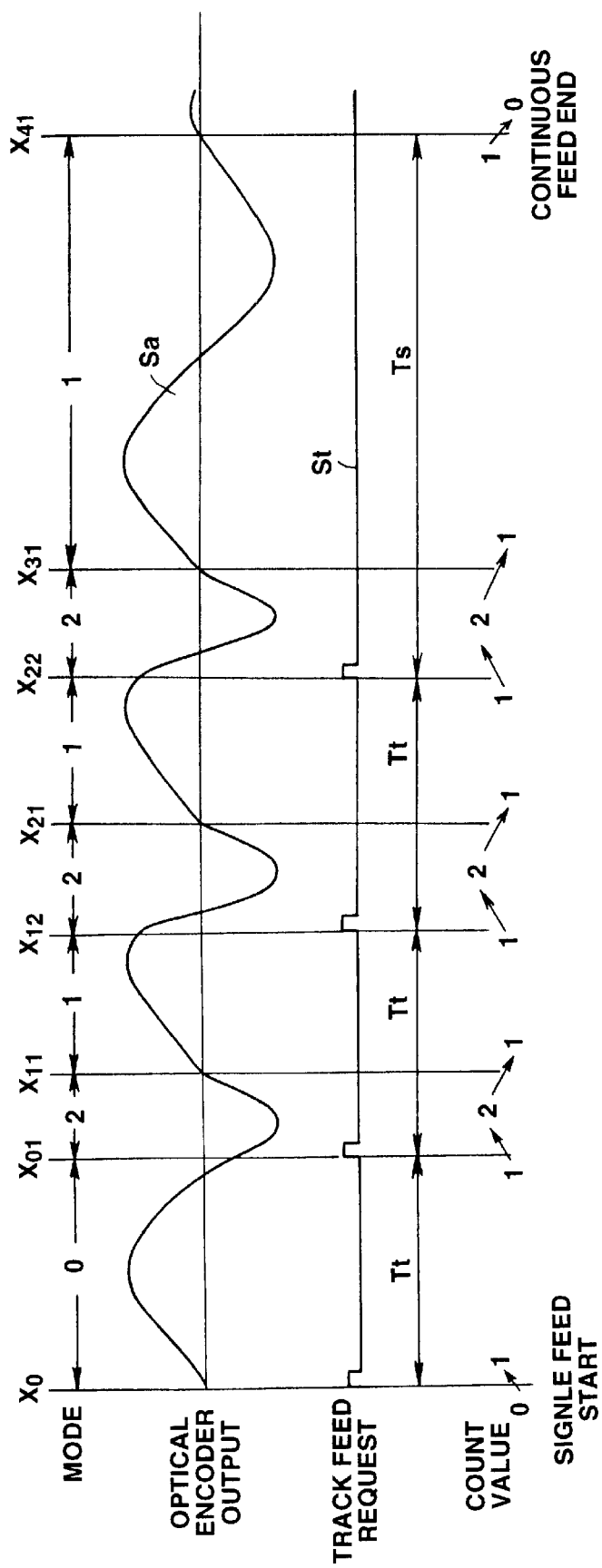
FIG. 20 is a graph shows the switching of the track feed mode of the magnetic head by the recording/reproducing apparatus on the continuous arrival to the recording/reproducing apparatus of the track feed requesting pulses in succession.

The controller 9 selects the track feed mode every pre-set time interval Δt to control the movement speed of the magnetic head 10 with the selected track feed mode. Referring to FIG. 20, the control of the movement speed of the magnetic head 10 based on the transition of the current count value is explained. In the following explanation, it is assumed that four consecutive track feed requesting pulses St arrived at the controller 9 every time interval $T_r$.

It is noted that the zero-crossing points generated in each period of the first optical signal SB from the optical encoder 15 ($X_0$ to $X_{11}$ domain, $X_{11}$ to $X_{21}$ domain, $X_{21}$ to $X_{31}$ domain and $X_{31}$ to $X_{41}$) are associated with the centers of the respective data tracks, as described above. In the first optical signal $S_a$, the position $X_0$ corresponding to the first zero-crossing point is termed the track center of the first data track, the position $X_{11}$ corresponding to the second zero-crossing point is termed the track center of the second data track, the position $X_{21}$ corresponding to the third zero-crossing point is termed the track center of the t data track, and the position $X_{41}$ corresponding to the fourth zero-crossing point is termed the track center of the fourth data track, for convenience sake.

The controller 9, which has detected the first track feed requesting pulse $S_t$, starts the track feed of the magnetic head 10 from the track center of the first data track. That is, the controller 9 detects that the current count value has been changed from 0 to 1, by detecting that the current count value is 1 at step S29 in FIG. 19, and by detecting that the count value Δt ahead is 0. That is, the controller 9 detects that the request has been made for shifting the magnetic head 10 in the standstill state on the first data track to the neighboring second data track. Thus, the mode 0 is selected at step S31. The controller 9 at step S38 refers to the expected speed table corresponding to the mode 0 to control the movement speed of the magnetic head 10 to start the movement of the magnetic head 10. That is, the controller 9 detects the first track feed requesting pulse to start the movement of the magnetic head 10 by controlling the movement start time.

The controller 9 causes movement of the magnetic head 10 to the second data track by the mode 0 speed control, as it monitors the arrival of the track feed requesting pulses and the first optical signal $S_a$ at an interval of Δt (=0.24 msec). In the present embodiment, on passage through the position $X_{01}$ of the movement stroke to the second data track, that is after lapse of time $T_t$ since the arrival of the previous track feed requesting pulse, there arrives the new track feed requesting pulse. The controller 9 detects the oncoming of the new track feed requesting pulse at step S21. The controller 19 at step S22 counts up the current count value to set the current count value to 2. Since this detects that, at steps S28 and S29, the current count value is neither 0 not 1, the mode 2 is selected at step S32.

The controller 9 at step S38 refers to the expected speed table associated with the mode 2 to start the control of the movement speed of the magnetic head 10. The movement speed of the magnetic head 10 is controlled to be the so-called constant-speed track feed. The controller 9 also causes movement of the magnetic head 10 to the second data track by mode 0 speed control as the arrival of the track feed requesting pulses and the first optical signal Sa are monitored at an interval of Δt. Since now the zero-crossing point of the first optical signal Sa outputted by the optical encoder 15 is detected, that is since the completion of track feed for one data track is detected, the current count value is counted down at step S27 as a result of arrival at the track center of the second data track of the magnetic head 10. That is, the controller 9 sets the current count value to 1. Since this detects at step S29 that the current count value is 1, while detecting at step S33 that the count value Δt ahead is 2, the mode 1 is set at step S34.

The controller 9 at step S38 refers to the expected speed table associated with the mode 1 to start control of the movement speed of the magnetic head 10. The control of the movement speed of the magnetic head 10 is the sole track feed devoid of the so-called movement start time control. The controller 9 causes the movement of the magnetic head 10 to the third data track by mode 1 speed control as it monitors the arrival of the track feed requesting pulses and the first optical signal $S_a$ at an interval Δt. At the position $X_{01}$ of the movement stroke to the third data track, the controller 9 detects the arrival of the new track feed requesting pulses. The controller 9 detects the arrival of the new track feed requesting pulse at step S21.

As in the processing at the position X01, the controller 9 selects the mode 2 at step S32 by countup of the current count value. The controller 9 performs the speed control of the magnetic head 10 with the mode 2, until the magnetic head 10 is positioned in the track center of the third data track, and counts down the current count value on detection of the arrival at the track center of the second data track (position $X_{21}$), that is on detection of the zero-crossing point.

The speed control by the controller 9 of the magnetic head 10 up to the track center position of the third data track ($X_{21}$ to $X_{31}$ domain) is similar to the speed control from the track center of the second data track to the track center of the third data track ($X_{11}$ to $X_{21}$ domain). That is, the controller 9 performs the speed control of the magnetic head 10 with the mode 1 until arrival of the track feed requesting pulse, while performing the speed control with the mode 2 since the time point of arrival of the track feed requesting pulse until passage over the track center of the fourth data track.

Since the current count value is changed from 2 to 1 by the passage of the magnetic head through the track center of the third data track, the controller 9 again controls the movement of the magnetic head 10 by speed control with the mode 1. In the present embodiment, since the number of the track feed requesting pulses is four, that is since the fourth data track is the data track of ultimate destination, there is no oncoming track feed requesting pulse. Thus, the controller 9 directly causes movement of the magnetic head 10 to the track center of the fourth data track by mode 1 speed control. On detection of passage through the track center of the fourth data track, the controller 9 counts down the current count value. Since this changes the current count value from 1 to 0, the controller 9 sets the lower-order tracking control circuit 7b to its operating state to perform the positioning control to the track center by the above-mentioned track-follow.

The above is the single track feed and continuous track feed performed by the recording/reproducing apparatus 1.

For continuous track feed, the recording/reproducing apparatus occasionally generates the state of the constant speed track feed (mode 2) anew responsive to the track feed requesting pulses arriving in succession and incidentally switches between the single track feed (mode 1) and the constant-speed track feed (mode 2) to effect the continuous track feed reliably and smoothly even if the magnetic head 10 is driven by the above-mentioned voice coil motor.

For realisation of the continuous track feed reliably, the control speed of the constant-speed track feed (mode 2) is set so as to be faster than the maximum repetition speed of the track feed requesting pulses. This allows the recording/ reproducing apparatus 1 to realize smooth continuous track feed if the track feed requesting pulses arrive at an arbitrary speed not exceeding the control speed.

With the recording/reproducing apparatus 1, the movement of the magnetic head can be completed within the time allowed for continuous track feed even if the track feed time for a sole data track exceeds the track feed request time.

Figure 21:
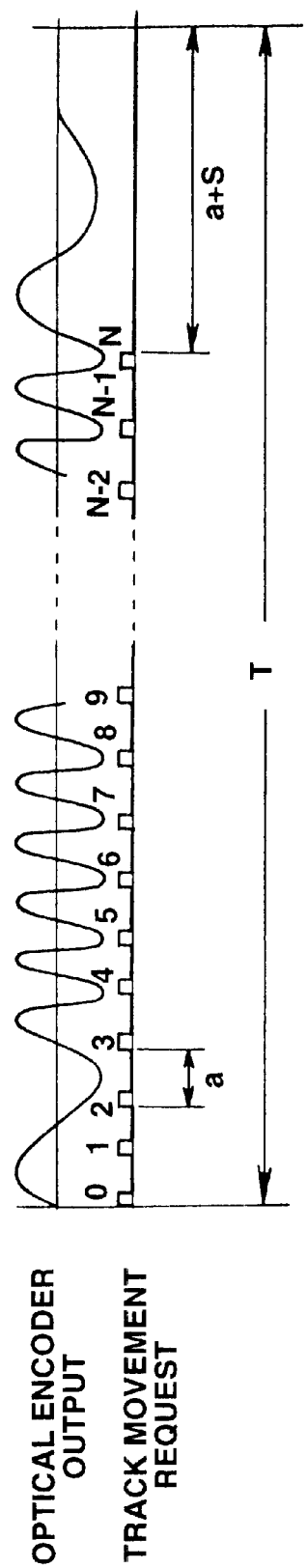
FIG. 21 illustrates that continuous track feeding can be realized at all times in the continuous track feed execution allowing time duration.

That is, so-called settling time S is provided after n consecutive track feed requesting pulses outputted at a constant track feed request time a from the external computer 300, as shown in FIG. 21. Thus, with the recording/reproducing apparatus 1, it is sufficient if the magnetic head arrives at the last data track within the time allowed for continuous track feed T=N X a+S.

Thus, with the recording/reproducing apparatus 1, track feed is nor made for each data track in the continuous track feed. Therefore, if the track feed time exceeds the track feed request time S, such surplus time can be compensated in the settling time S.

By the above operation, the recording/reproducing apparatus formulates the track position information on the loaded lower-order disc and effects track feed of the magnetic head 10, based on the prepared track position information, while effecting continuous track feed responsive to the continuously oncoming track feed requesting pulses.

If neither the lower-order disc nor the upper-order disc is loaded on the recording/reproducing apparatus 1, the magnetic head 10 is locked against movement. This prevents the collision of the heads 10A and 10B when none of the lower-order disc nor the upper-order disc is loaded, thus preventing destruction of the heads A or B.

With the conventional recording/reproducing apparatus 1, if the track feed requesting pulses arrive with the magnetic head locked against movement due to the non-loading of the magnetic disc, the magnetic head 10 actually cannot be moved, as a result of which there is produced disparity between the track position of the magnetic head comprehended by the external computer and the actual track position.

On the other hand, in the recording/reproducing apparatus embodying the present invention, if the track feed requesting pulses in the forward and reverse directions should arrive while the magnetic head 10 is in a non-movable state, the count value of the counter 9a is incremented or decremented responsive to the oncoming track feed requesting pulses, with the track feed of the magnetic head 10 occurring on the basis of the count value of the counter 9a when the magnetic head 10 is set to a movable state. Thus it is possible with the recording/reproducing apparatus 1 to count and hold the oncoming track feed requesting pulses, even when the magnetic head 10 is locked against movement, with the track feed of the magnetic head 10 occurring based on the held count value after the locked state of the magnetic head is released.

If the track feed requesting pulses should arrive when the track feed is performed on the basis of the track value held by the counter 9a, the track feed of the magnetic head 10 occurs as the counter 9a is counted up or counted down depending on the state of the oncoming track feed request pulses. That is, the track feed of the magnetic bead 10 is performed by the count value inclusive of the track feed requesting pulses making their arrival after start of movement of the magnetic head. After the magnetic head is unlocked against movement, the recording/reproducing apparatus performs control of the continuous track feed of the magnetic head 10 with the above-mentioned speed control modes based on the count value of the counter 9a.

Thus, with the recording/reproducing apparatus 1, if the track feed requesting pulses make their arrival with the magnetic head in the immovable state, the magnetic head is rendered movable, after which track feed is performed taking into account the track feed requesting pulses which have arrived during the time the magnetic head is immovable. This enables the recording/reproducing apparatus to reliably perform track feed in meeting with the oncoming track feed requesting pulses to assure coincidence with the track positions of the magnetic head 10 comprehended by the external computer 300.

Figure 22:
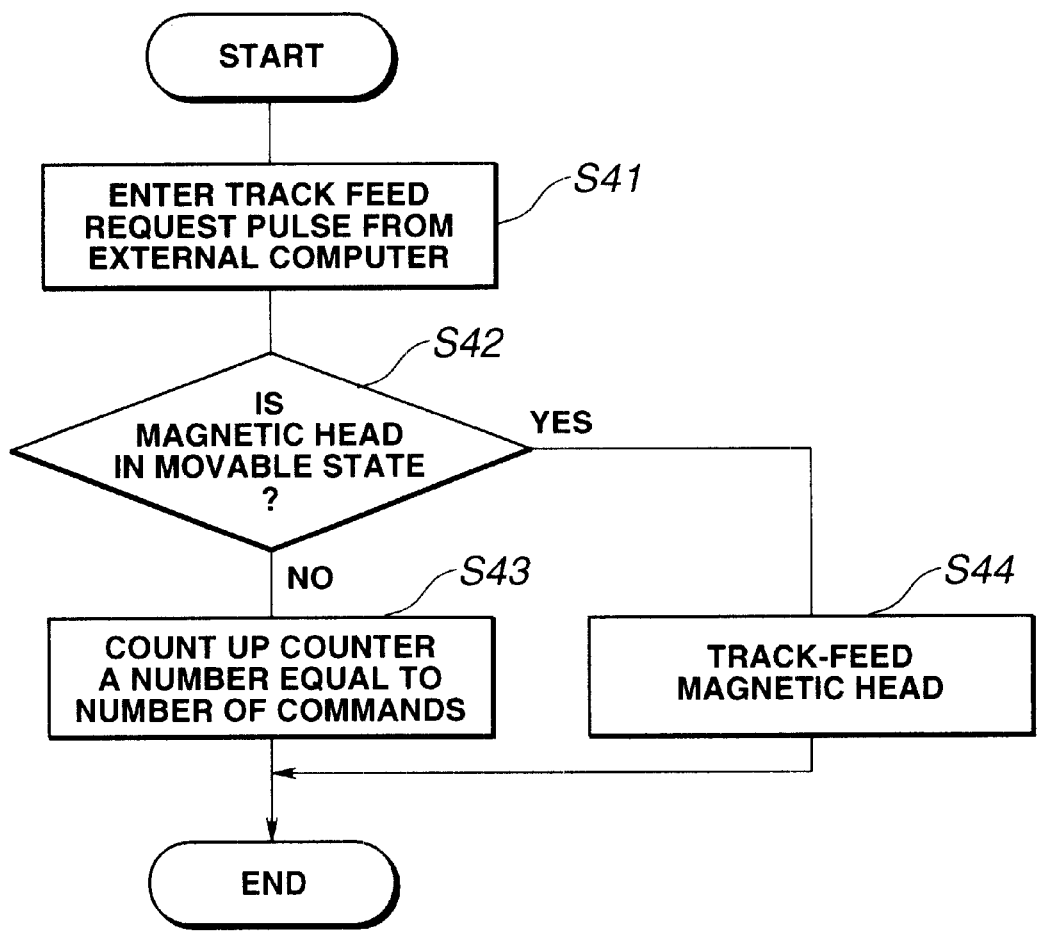
FIG. 22 is a flowchart showing the processing of verifying whether the magnetic head is in a movable state to effect track feed of the magnetic head.

FIG. 22 shows the specified processing of discriminating whether or not the magnetic head 10 is movable to effect track feed of the magnetic head 10.

First, at step S41, the track feed requesting pulses are fed from the external computer 300. At step S42, it is verified whether or not the magnetic head 10 is in the movable state, for example, whether or not it is not locked against movement. If the magnetic head is in the movable state, the track feed of the magnetic head is done responsive to the track feed requesting pulses arriving from the external computer 300. This track feed occurs in accordance with the flowchart shown in FIG. 23. If the magnetic head 10 is not movable, the counter counts up by the number of commands of the track feed requesting pulses arriving from the external computer 300, corresponding to the track feed requesting pulses in the positive direction in the present case.

By this processing, the recording/reproducing apparatus 1 counts the track feed requesting pulses arriving from the external computer 300 or drives the magnetic head 10.

Figure 23:
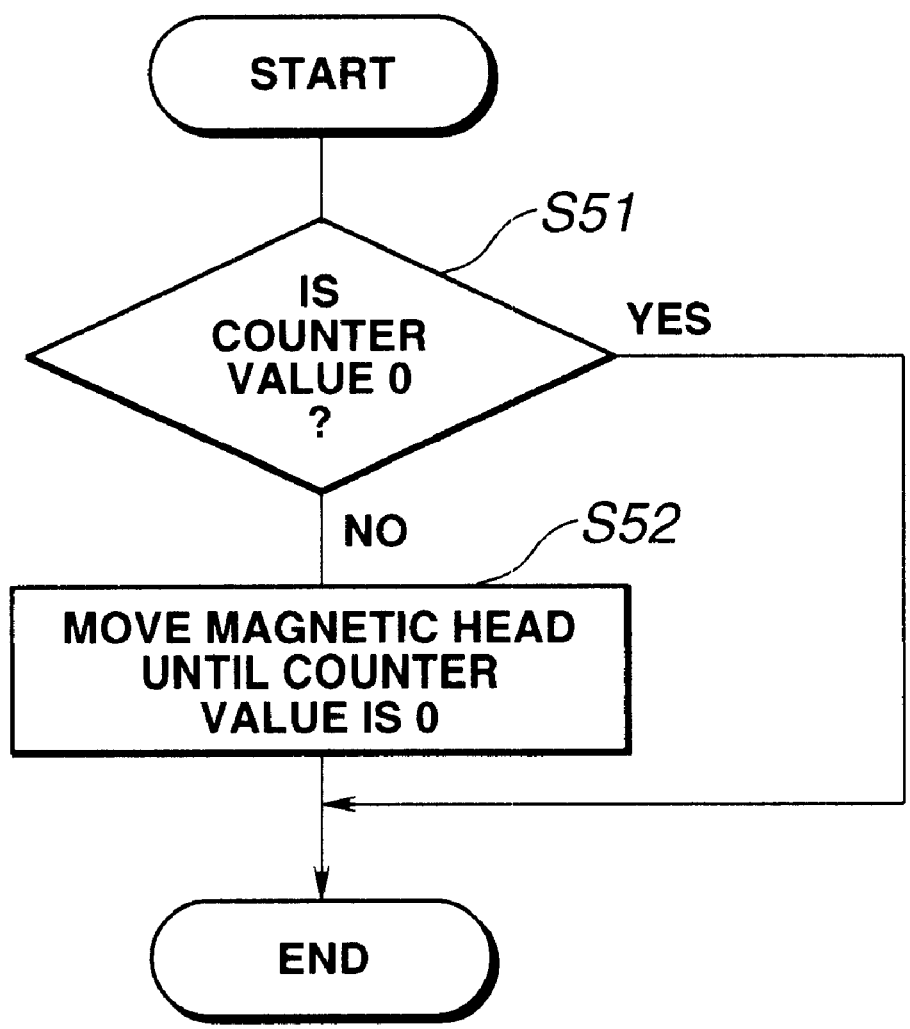
FIG. 23 is a flowchart showing the processing of track feeding of the magnetic head responsive to count values held by a counter following unlocking of the magnetic head.

FIG. 23 shows the processing for effecting track feed of the magnetic head 10 responsive to the count value held by the counter 9a in case the magnetic head 10 is movable, that is when the magnetic head 10 is unlocked against movement.

First, at step S51, it is verified whether or not the count value of the counter 9a is 0, that is whether or not the counter 9a is counting the track feed requesting pulses arriving when the magnetic head 10 is immovable. If it is confirmed that the count number of the counter 9a is 0, the processing is terminated. If the counter 9a is holding the count value other than 0, track feed of the magnetic head 10 is performed responsive to the count value held by the counter.

By this processing, the recording/reproducing apparatus is able to start the track feed of the magnetic head in the movable state.

In the above-described embodiment of the present invention, the track feed requesting pulses arriving during the time the magnetic head is locked against movement are counted. Alternatively, the track feed requesting pulses arriving when the recording/reproducing apparatus is executing the processing independently may also be counted. That is, with the recording/reproducing apparatus 1, it is also possible to execute preferentially the pull-in of the first optical signal $S_a$ for formulating the track position information and subsequently to effect track feed of the magnetic head 10 based on the count value of the counter 9a before the pull-in processing inclusive of the track feed requesting pulses arriving during the pull-in processing. Although the track feed requesting pulses are sent from the external computer it is also possible to construct the host computer and the recording/reproducing apparatus as one system.

What is claimed is:

1. A recording/reproducing apparatus comprising:
   a recording/reproducing head for recording/reproducing information signals for a recording medium having a plurality of data tracks extending substantially parallel to one another;

track position information formulating means for formulating track position information after said recording medium is loaded, based on an optical signal that varies as a function of track position;

head driving means for causing movement of said recording/reproducing head in a direction perpendicular to the data tracks on the recording medium;

counter means for counting track feed requesting signals to arrive at a count value;

head state detection means for detecting a state in which:
  1) said recording/reproducing head is unlocked to allow movement of said recording/reproducing head when said recording medium is loaded; and
  2) said track position information formulating has been completed; and track feed control means for controlling said head driving means, responsive to the count value and to the detected state, to effect track feed of said recording/reproducing head using said formulated track position information.

2. The recording/reproducing apparatus according to claim 1 wherein said recording medium is a disc-shaped recording medium.

3. The recording/reproducing apparatus according to claim 1 wherein said counter means includes holding means for holding the count value in memory.

4. The recording/reproducing apparatus according to claim 1 wherein said head driving means includes a voice coil motor.

5. The recording/reproducing apparatus according to claim 1 further comprising:
  discriminating means for discriminating a sort of the recording medium loaded thereon.

6. A recording/reproducing system comprising:
  a recording/reproducing head for recording/reproducing information signals for a recording medium having a plurality of data tracks extending substantially parallel to one another;

track position information formulating means for formulating track position information after said recording medium is loaded, based on an optical signal that varies as a function of track position;

head driving means for causing movement of said recording/reproducing head in a direction perpendicular to the data tracks on the recording medium;

a host computer issuing track feed requesting signals;

counter means for counting the track feed requesting signals to arrive at a count value;

head state detection means for detecting a state in which:
    1) said recording/reproducing head is unlocked to allow movement of said recording/reproducing head when said recording medium is loaded; and
    2) said track position information formulating has been completed; and track feed control means for controlling said head driving means, responsive to the count value and to the detected state, to effect track feed of said recording/reproducing head using said track position information.

7. A recording/reproducing method in which a recording/reproducing head is moved relative to a recording medium having a plurality of data tracks extending substantially parallel to one another for recording/reproducing information signals by said recording/reproducing head, the method comprising:

a step for counting track feed requesting signals;

a step for formulating track position information after said recording medium is loaded, based on an optical signal that varies as a function of track position;

a step for detecting a state in which:
    1) said recording/reproducing head is unlocked to allow movement of said recording/reproducing head when said recording medium is loaded; and
    2) said track position information formulating has been completed; and a track feed control step for effecting track feed of said recording/reproducing head responsive to the count value and to the detected state, using said formulated track position information.

* * * * *

UNITED STATES PATENT AND TRADEMARK OFFICE
CERTIFICATE OF CORRECTION

PATENT NO. : 6,407,877 B1
DATED : June 18, 2002
INVENTOR(S) : Akira Mitani

It is certified that error appears in the above-identified patent and that said Letters Patent is hereby corrected as shown below:

Column 1,
Line 17, change "bu" to -- by --.
Line 30, change "how" to -- now --.
Line 50, change "al" to -- a --.

Column 3,
Line 10, change "graph shows" to -- graph that shows --.
Line 30, change "be-explained" to -- be explained --.
Line 31, change "embodiments" to -- embodiment --.

Column 4,
Line 2, delete "and".

Column 6,
Line 17, change "21" to -- 21a --.

Column 7,
Line 31, change "from" to -- form --.
Line 44, delete "in".

Column 8,
Line 7, delete "," between "the" and "above".
Line 46, change "rate etc" to -- rate, etc. --.
Line 60, delete ","

Column 9,
Line 15, change "re-verse" to -- reverse --.

Column 11,
Line 57, change "neigh boring" to -- neighboring --.

Column 13
Line 47, change "sped" to -- speed --.

Column 14,
Line 35, insert -- , -- between "mode" and "a".

UNITED STATES PATENT AND TRADEMARK OFFICE
CERTIFICATE OF CORRECTION

PATENT NO. : 6,407,877 B1
DATED : June 18, 2002
INVENTOR(S) : Akira Mitani

It is certified that error appears in the above-identified patent and that said Letters Patent is hereby corrected as shown below:

Column 15,
Line 44, change "cat" to -- at --.
Line 54, change "s29" to -- S29 --.
Line 56, change "confined" to -- confirmed --.

Column 16,
Line 5, delete "it is", second occurrence.
Line 18, delete "not".

Column 17,
Line 50, change "19" to -- 9 --.

Column 19,
Line 16, change "nor" to -- now --.
Line 60, change "bead" to -- head --.

Signed and Sealed this

Eleventh Day of March, 2003

JAMES E. ROGAN
*Director of the United States Patent and Trademark Office*